(12) United States Patent
Newton

(10) Patent No.: US 12,442,212 B1
(45) Date of Patent: Oct. 14, 2025

(54) METHODS AND APPARATUS FOR A HABITABLE ELECTRONIC MATERIAL SYSTEM

(71) Applicant: Heidi Newton, San Jose, CA (US)

(72) Inventor: Heidi Newton, San Jose, CA (US)

( * ) Notice: Subject to any disclaimer, the term of this patent is extended or adjusted under 35 U.S.C. 154(b) by 315 days.

(21) Appl. No.: 18/230,814

(22) Filed: Aug. 7, 2023

Related U.S. Application Data

(60) Provisional application No. 63/395,847, filed on Aug. 7, 2022.

(51) Int. Cl.
| | |
|---|---|
| *E04H 15/12* | (2006.01) |
| *E04H 15/54* | (2006.01) |
| *F24F 11/52* | (2018.01) |
| *H02J 7/35* | (2006.01) |
| *H02S 40/38* | (2014.01) |
| *H02S 40/40* | (2014.01) |
| *H05B 3/00* | (2006.01) |
| *F24F 120/00* | (2018.01) |

(52) U.S. Cl.
CPC ............. *E04H 15/12* (2013.01); *E04H 15/54* (2013.01); *F24F 11/52* (2018.01); *H02J 7/35* (2013.01); *H02S 40/38* (2014.12); *H02S 40/40* (2014.12); *H05B 3/008* (2013.01); *F24F 2120/00* (2018.01); *F24F 2221/12* (2013.01); *F24F 2221/34* (2013.01); *F24F 2221/38* (2013.01)

(58) Field of Classification Search
CPC .......... E04H 15/12; H02S 40/38; H02S 40/40
See application file for complete search history.

(56) References Cited

U.S. PATENT DOCUMENTS

| | | | | |
|---|---|---|---|---|
| 5,244,508 A | * | 9/1993 | Colozza | B64G 1/443 |
| | | | | 136/292 |
| 11,962,271 B1 | * | 4/2024 | Cunning | H02S 40/36 |
| 2022/0416102 A1 | * | 12/2022 | Chiu | H10F 19/85 |
| 2023/0140009 A1 | * | 5/2023 | De Campos | H02S 20/20 |
| | | | | 136/251 |
| 2023/0212871 A1 | * | 7/2023 | Xu | E04H 15/54 |
| | | | | 135/96 |
| 2023/0272639 A1 | * | 8/2023 | Guo | E04H 15/54 |
| | | | | 135/92 |
| 2023/0318520 A1 | * | 10/2023 | Fuchs | H02S 30/20 |
| | | | | 136/251 |

* cited by examiner

*Primary Examiner* — Jayne L Mershon

(57) ABSTRACT

Disclosed herein is a habitable electronic material system that may comprise at least one layer of material having at least one embedded electronic sensor operable to detect at least one environmental indicator. The at least one layer of material is flexible and operable to form an interior space operable to support a user. The habitable electronic material system may be portable by manpower. The at least one layer may comprise a water-resistant layer, a solar energy collection subsystem layer protected by the water-resistant layer, a thermal insulator layer, and an energy storage subsystem layer. The habitable electronic material system may comprise a computer subsystem partially imbedded into the electronic material system and operably coupled with the solar energy collection subsystem and the energy storage subsystem. The habitable electronic material system may comprise a thermal converter subsystem operable to enable a user to control the temperature within the interior space.

20 Claims, 15 Drawing Sheets

| X: Tech Field / Y: Subsystem | Sensor Tech. | Nano-Tech. | Medical Tech. | Bio-Tech | Acoustic Engr'g | Electrical Engr'g | Thermo-Dynamics | Energy Gen. & Storage | Computing & IT | Materials Science/Intelligence |
|---|---|---|---|---|---|---|---|---|---|---|
| (1) Primary Subsystem: Energy | | | | | | | | | | |
| Utility Power Interface (Transfer Switch Between Utilities & Local Sources) | ✓ | | | | | | | ✓ | | ✓ |
| Organic Solar Cells | ✓ | | | ✓ | | ✓ | ✓ | ✓ | | ✓ |
| Beta Voltaic Generator Cells | ✓ | ✓ | | | | | ✓ | ✓ | | ✓ |
| Electrical Potential Energy | ✓ | | | | | ✓ | ✓ | ✓ | | ✓ |
| Nano-Battery Storage | ✓ | ✓ | | | | | | ✓ | | ✓ |
| (2) Primary Subsystem: Structural | | | | | | | | | | |
| Pneumatic Ribs | | | | | | | | | | ✓ |
| Memory Muscle | | ✓ | | | | ✓ | | | | ✓ |
| Nanogel Structural Composite Panels | | ✓ | | | | ✓ | | | | ✓ |
| (3) Primary Subsystem: Life Support/Environmental Control | | | | | | | | | | |
| Air-Stream insulation | | | | | | | ✓ | ✓ | | ✓ |
| Peltier Heat Pumps | ✓ | | | | | ✓ | ✓ | ✓ | | ✓ |
| Thermo-Dynamic Heat Exchanger | | | | | | ✓ | ✓ | ✓ | ✓ | ✓ |
| Fire/Smoke/Air Quality Sensor Package | ✓ | | | | | ✓ | | | | ✓ |
| Temperature Sensors (Interior/Exterior Environment) | ✓ | | | | | | | | | ✓ |
| Occupant Skin | ✓ | | ✓ | | | | | | ✓ | ✓ |

FIG. 5A

| | 1 | 2 | 3 | 4 | 5 | 6 | 7 | 8 | 9 | 10 |
|---|---|---|---|---|---|---|---|---|---|---|
| Temperature Sensor (IR) | | | | | | | | | | |
| Heart Rate Monitor | √ | | √ | | | | | | √ | √ |
| (4) Primary Subsystem: Internal Electro-Optical Distribution/Interconnection | | | | | | | | | | |
| Fiber Optics | √ | | | | √ | | | | √ | √ |
| Stretchable Silicon | √ | | | | √ | | | | | √ |
| Electrical Potential Energy Storage | √ | | | | √ | √ | √ | | | √ |
| (5) Primary Subsystem: Security, ID & Privacy | | | | | | | | | | |
| Motion Sensor | √ | | | √ | | | | | √ | √ |
| Facial Recognition & Expression Software | √ | | √ | | | | | | √ | √ |
| Voice Recognition Software | √ | | √ | | √ | | | | √ | √ |
| Biometric Security Sensor (Fingerprints/retinal maps) | √ | | √ | √ | | √ | | | √ | √ |
| Noise Generator (White/Pink) | √ | | √ | | √ | | | | √ | √ |
| WiFi Privacy Control Software | √ | | | | | √ | | | √ | √ |
| Cloaking Material | √ | | | | | | | | √ | √ |
| (6) Primary Subsystem: Communications & IT | | | | | | | | | | |
| CPUS Graphic Processors, Mass Storage | | | | | | | | | √ | √ |
| Input Sensor Interfaces | | | | | | | | | √ | √ |
| Output Products (Data Burner or Their Interfaces) | | | | | | | | | √ | √ |
| WiFi Access Hardware | | | | | | | | | √ | √ |
| Voice | | | | | | | | | √ | √ |

FIG. 5B

|  |  |  |  |  |  |
|---|---|---|---|---|---|
| ✓ | ✓ | ✓ | ✓ | ✓ | ✓ |
| ✓ | ✓ | ✓ | ✓ | ✓ | ✓ |
|  |  |  |  |  |  |
|  |  |  |  |  |  |
|  |  | ✓ | ✓ |  |  |
| ✓ |  | ✓ |  |  |  |
|  |  |  | ✓ | ✓ |  |
|  |  |  |  | ✓ |  |
|  |  |  |  |  |  |
|  |  |  |  |  |  |
|  | ✓ | ✓ |  | ✓ | ✓ |
| Recognition/ Synthesizer Communications Software | Camera & Facial Expression Software (Interface to above) | PVDF (Speaker/ Microphone Array) | OLED Optical Display (Interior Wall Layer; Incl. 3D Stereoscopic Displays) | Neuroscience Control Software | *2D Hologram Displays |

FIG. 5C

| X: Functional Requirement Potentially Met by Material or Technology  Y: Material /Technology | Energy Generation & Storage System | Structural System | Acoustic System | Life Support/ Environmental Control/ Thermo- Dynamic System | Internal Electro- Optical Distribution/ Interconn- ection System | Security & ID System | Privacy System | Computing & IT Commun- ications System | Material Science Intelligence System |
|---|---|---|---|---|---|---|---|---|---|
| Utility Power Interface (Transfer Switch Between Utilities & Local Sources) | ✓ | | | | | | | | |
| Organic Solar Cells | ✓ | | | | | | | | |
| Beta Voltaic Generator Cells | ✓ | | | | | | | | |
| Electrical Potential | ✓ | | | | | | | | |

FIG. 5C (CONTINUATION)

| Feature | C1 | C2 | C3 | C4 | C5 | C6 | C7 | C8 | C9 |
|---|---|---|---|---|---|---|---|---|---|
| Energy | ▨ | | | | | | | | |
| Nano-Battery Storage | √ | | | | | | | | |
| Pneumatic Ribs | | √ | | | | √ | | | |
| Memory muscle | | √ | | | | | | | |
| Nanogel Structural Composite Panels | | √ | √ | √ | √ | | | | |
| Air-Stream Insulation | | | √ | √ | | √ (Acoustic) | | | |
| Peltier Heat Pumps | | | | √ | | | | | |
| Thermo-Dynamic Heat Exchanger | √ | | | √ | | | | | |
| Fire/Smoke/Air Quality Sensor Package | | | | √ | | | | | |
| Temperature Sensors (Interior/Exterior Environment) | | | | √ | | | | | |
| Occupant Skin Temperature Sensor (IR) | | | | √ | | | | | |
| Heart Rate Monitor | | | | √ | | | | | |
| Fiber Optics | | | | | √ | | | | |
| Stretchable Silicon | | | | | √ | | | | |
| Electrical Potential Energy Storage | | | | | √ | | | | |
| Motion Sensor | | | | | | √ | | | |
| Facial Recognition & Expression Software | | | | | | √ | | | |
| Voice Recognition Software | | | | | | √ | | | |
| Biometric Security Sensor (Fingerprints/Retinal maps) | | | | | | √ | √ | | |

FIG. 5D

| Feature | 1 | 2 | 3 | 4 | 5 | 6 | 7 | 8 | 9 |
|---|---|---|---|---|---|---|---|---|---|
| Noise Generator (White/Pink) | | | | | | √ | | | |
| WiFi Privacy Control Software | | | | | | | √ | | |
| Cloaking Material | | | | | | √ | √ | | |
| CPUS Graphic Processors, Mass Storage | | | | | | | √ | | |
| Input Sensor Interfaces | | | | | | | √ | | |
| Output Products (Data Burner or Their Interfaces) | | | | | | | √ | | |
| WiFi Access Hardware | | | | | | | √ | | |
| Voice Recognition/ Synthesizer Communications Software | | | | | | | √ | | |
| Camera & Facial Expression Software (Interface to above) | | | | | | | √ | | |
| PVDF (Speaker/ Microphone Array) | | | √ | | | | √ | | √ |
| OLED Optical Display (Interior Wall Layer; Incl. 3D Stereoscopic Displays) | | | | | | | √ | | |
| Neuroscience Control Software | | | | | | | √ | | |
| *2D Hologram Displays | | | | | | | √ | | |

FIG. 5E

METHODS AND APPARATUS FOR A HABITABLE ELECTRONIC MATERIAL SYSTEM

CROSS-REFERENCE TO RELATED APPLICATION

This application claims the benefit of U.S. Provisional Patent Application No. 63/395,847 filed Aug. 7, 2022, which is incorporated herein in its entirety by reference.

BACKGROUND

Multiple attempts to create a portable living space have been made. Archigram's Cushicle, intended for use by wanderers, enables wearing clear plastic material capable of being inflated to expand into an enclosure for sleeping in and being collapsible. Archigram's Cushicle enclosure material has a heating apparatus attached. Archigram's Cushicle includes a radio and television, but said devices are contained inside a helmet. Archigram's Cushicle's enclosure material is simple transparent plastic that does not provide any protection from the sun. Archigram's Cushicle cannot respond to current demands for a digital nomadic and techno-centric alternative lifestyle including hybrid online learning, remote work, telehealth, and internet-based entertainment.

Other existing inventions in the space include a rolled up, self-erecting fence, produced by the Central Intelligence Agency (CIA). The CIA fence uses solar energy produced by photovoltaic cells. The sun provides the solar energy necessary to self-erect after laying it flat on ground. It has no roof, it is not inhabitable, and it is not part of a mobile living unit.

The COVID-19 pandemic resulted in widespread distance learning and remote work globally that largely continued for the past couple years and may persist or reoccur. Most adults still rent or own a home anchored geographically by on-grid infrastructure, which limits ability to afford to work remotely or do distance learning elsewhere for long. During this time, the housing crisis has worsened dramatically in many countries and there was a large increase in homelessness even among the employed population, college students, and children. Households have become more crowded with multi-generations of families living under one roof, often with additional renters. As a result of experiencing homelessness or being geographically stuck in anchored, crowded homes spaced close together, with limited access to nature, a large number of humans globally have experienced decreased quality of life, increased stress levels, a decline in mental health, and increased suicide rates. Disclosed herein is a solution to the housing crisis and can mitigate nonintentional homelessness.

The current options for those experiencing homelessness have been limited; a large number of people experiencing homelessness currently live transiently in crowded homeless shelters, cars, and/or tents which limits their access to internet connectivity and a power source. Such greater challenges in accessing online distant learning content and online work than those with stable households have exacerbated economic disparity. School-provided hand-held electronic devices (such as Chromebooks) for accessing online learning, and employee-provided work laptops for accessing collaborative work files and online meetings could not function without access at "home" to a power source and internet connectivity, and these devices were at greater risk of getting lost or stolen in transient and crowded living environments with less privacy and security.

More crowded households made distance learning and remote work environments noisier and consequently, the inhabitants struggled to focus on learning and work tasks which impaired academic performance and work performance. Living in tents and cars resulted in decreased internet connectivity which impaired opportunity for social interaction among peers and co-workers. Impaired social interaction increased feelings of isolation and stress which impaired mental health and contributed to increased suicide rates globally. Further, living in tents limits the ability for temperature control. There is no integrated heating system in tents.

Existing large electronic displays and user interface screens are heavy, rigid, often attached to the wall by hanging mechanisms, but they remain separate apparatuses from the wall of a home, not integrated or embedded to the surface of a wall, and not one apparatus with the wall. They often have messy cords that need to be plugged into an outlet which creates clutter that causes psychological stress, and they are meant to remain in one place (not transported regularly).

Existing conventional homes have architectural systems that take up a large amount of space and the homes that provide modern-lifestyle functions with detached communication, audio, optical, thermal control and thermal conversion apparatuses and systems can complicate lifestyles with "device clutter" and geographic anchorage due to the systems being powered on-grid, geographically fixed, stand-alone systems which increases psychological stress. The invention offers a multi-layer, all-in-one solution to modern day device clutter that integrates many layers with various functions into a single habitable material. The invention can function on or off-grid, collecting, storing, and distributing energy to the entire skin, so the inhabitant is mobile and functioning for a techno-nomadic lifestyle as a digital nomad.

Existing conventional homes limit people to reside in geographically fixed buildings or high-rise apartments, often closely spaced and anchored by on-grid infrastructure, which limits mobility, opportunity for travel, and experience in nature during remote work and distance learning. The invention implies a live-in-computer/live-work unit that can function off-grid, collecting, storing, and distributing energy from the sun to the material enclosure, so the inhabitant is mobile for a techno-nomadic lifestyle as a digital nomad. The invention can decrease human crowding and expand human existence. The invention offers a habitable apparatus that reflects, boosts, and celebrates technocentric human progress.

The existing built environment globally caused a large footprint on Earth that is visible from outer space and resulted in exacerbating climate change, which has impaired humankind's health and increased probability for human extinction. The invention allows digital nomads to be more connected with nature while staying digitally connected and decreasing human crowding. This invention allows adventurous human habitation in more off-grid remote areas while having a lighter environmental footprint on Earth. This invention is for a sustainable future.

SUMMARY

Some embodiments may comprise a habitable electronic material system. The habitable electronic material system may comprise at least one bonded layer of material that may have at least one embedded electronic sensor operable to detect at least one environmental indicator, wherein the at least one bonded layer of material may be a flexible material and may be operable to form an interior of the habitable electronic material system operable to support a user. The at least one bonded layer may comprise a water-resistant layer, a solar energy collection subsystem layer protected by the water resistant layer, a thermal insulator layer under the solar energy collection subsystem layer, an energy storage subsystem layer under the solar energy collection layer; and a computer subsystem at least partially imbedded within the at least bonded layer of material and operably coupled with the solar energy collection subsystem and the energy storage subsystem. The habitable electronic material system may comprise a transceiver operably coupled with the computer system and operable to connect with an external integrated communications network. and a thermal converter subsystem operable to enable a user to control the temperature within the habitable electronic material system.

Some embodiments may comprise wherein the at least one bonded layer of material may comprise a structure that may be collapsible. In some embodiments, the collapsed structure may be sized and configured such that it may be transported by an average individual without external aid. The collapsed structure may further be light weight enough to be transportable by an average individual.

Some embodiments may comprise an acoustic subsystem, the acoustic subsystem may comprise a polyvinyl difluoride piezoelectric layer. The polyvinyl difluoride piezoelectric layer may be operably coupled with the computer system and may be operable to receive and transmit acoustic signals.

Some embodiments may further comprise an optical subsystem, wherein the optical subsystem may comprise at least one light controllable by a user and an optical display user-interface screen that may cover part of or most of the interior surface of the habitable electronic material system of embodiment 0010.

Some embodiments may comprise wherein the solar energy collection subsystem layer may comprise a nano-photovoltaic layer, and a thermal nano-polypropylene insulating layer operable to insulate interior system layers and the interior of the habitable electronic material system from external thermal effects.

Some embodiments may further comprise an acoustic nano-polypropylene insulating layer operable to insulate interior system layers and the interior of the habitable electronic material system from external acoustics.

Some embodiments may further comprise the system comprising a matrix of nano-scale infrared (IR) emitters operable to emit IR energy at mid-wavelengths, wherein the matrix of nano-scale IR emitter may be operable to sense the IR temperature of the interior of the habitable electronic material system within the enclosure and wherein the matrix of nano-scale infrared (IR) emitters may be operable to emit infrared energy at mid-wavelengths for heating the living space and to sense the IR temperature of at least one user occupying the space.

Some embodiments may further comprise the computer subsystem further comprising a nano-artificial intelligence subsystem having operable access to an artificial intelligence system placed in the cloud, and a machine learning subsystem in communication with the artificial intelligence subsystem.

Some embodiments may further comprise the energy storage subsystem layer comprising a rechargeable polymer-based paper battery.

Some embodiments may further comprise the solar energy collection subsystem interior layer being operably coupled to each of the rechargeable polymer-based paper battery energy storage subsystem layer and to at least one DC power supply. The energy storage subsystem layer may further comprise an AC switcher operably coupled to each of the at least one DC power supply, back-up power grid, and a computer subsystem that may be partially embedded into an optical subsystem layer.

Some embodiments may further comprise the optical subsystem layer further comprising at least one graphics controller in communication with at least one pre-amplifier and at least one output amplifier that may be within an acoustic subsystem layer, wherein the at least one pre-amplifier and the at least one output amplifier may be operably coupled to DC power supply and wherein the computer subsystem may be in communication with a graphics controller comprised within the optical subsystem layer.

Some embodiments may further comprise wherein the optical subsystem layer may comprise at least one graphics controller operably coupled to a temperature controller comprised within the thermal converter/heating and/or cooling subsystem layer, wherein the at least one graphics controller may be operably coupled to the optical display user-interface screen.

Some embodiments may further comprise, wherein the thermal converter subsystem may further comprise at least one temperature controller in communication with the computer subsystem at least one body temperature sensors, in communication with the at least one temperature controller and with the computer subsystem that may be each of partially embedded into the electronic material system; at least one body temperature sensor partially embedded into the habitable electronic material system and facing the habitable interior space.

Some embodiments may further comprise wherein the thermal converter subsystem may comprise a thermoelectric heat pump operably coupled with the at least one temperature controller. The thermoelectric heat pump may be a flexible heat exchanger operable to provide heating or cooling to the habitable interior space. Some embodiments may comprise a heat pump that may be used for heating and/or cooling.

Some embodiments may further comprise wherein the thermal converter subsystem may further comprise a temperature controller operably coupled to distributed infrared (IR) heating elements in the thermal converter subsystem layer.

Some embodiments may further comprise a physical security subsystem operably in communication with the optical subsystem, acoustic subsystem, and computer subsystem all layered in or partially embedded in one material system, that provides the detection of unauthorized or unwanted entry or penetration of the habitable electronic material as an input to a security alarm or computer record of such an event.

Some embodiments may further comprise at least one medical peripheral operably coupled with the habitable electronic material system. Some embodiments may comprise wherein the at least one medical peripheral may comprise a life support oxygen system or other medical peripheral.

Some embodiments may further comprise wherein the at least one bonded layer of material may be operable to be coupled with an existing apparatus or at least one other habitable electronic material system.

Some embodiments may further comprise wherein the habitable electronic material system may be operable to be coupled to at least one brain-computer interface, such as Neuralink®, for controlling the habitable electronic material system with the user's brain activity.

Some embodiments may include methods of using the habitable material electronic system.

The various embodiments described in the summary and this document are provided not to limit or define the disclosure or the scope of the claims.

BRIEF DESCRIPTION OF THE FIGURES

FIGS. 5a-5e illustrate various tables providing information regarding various components of the invention.

DETAILED DESCRIPTION

Figure 1:
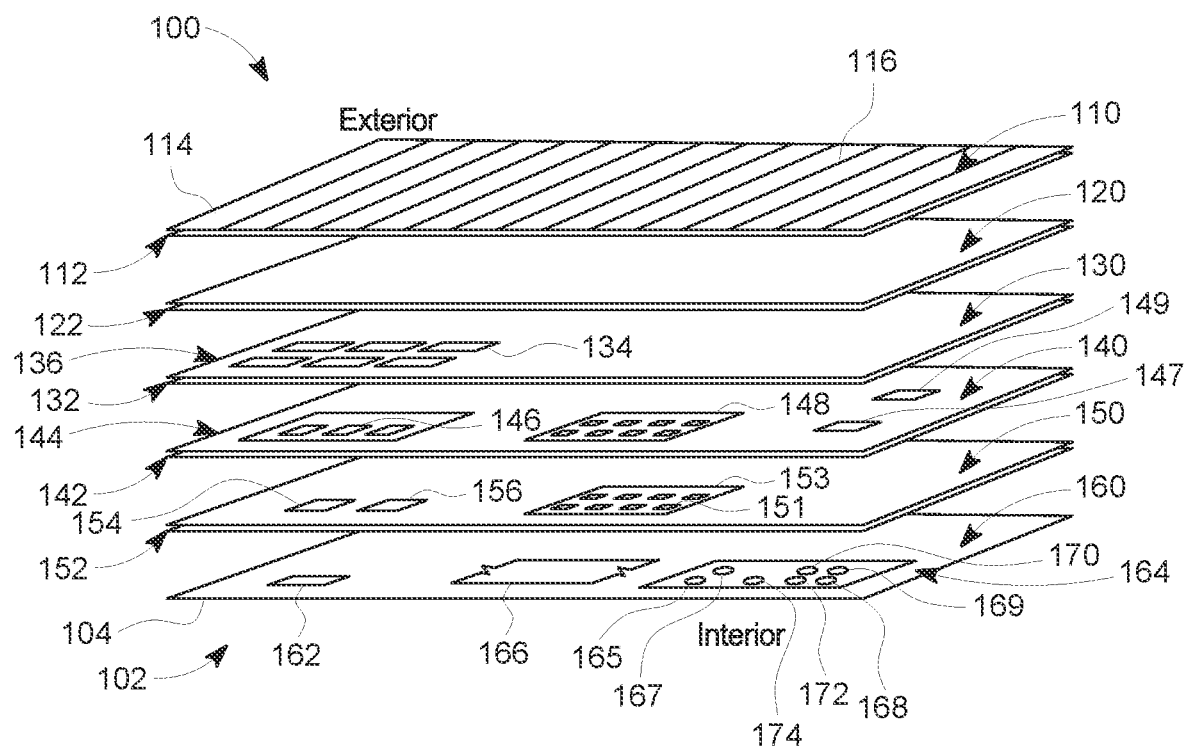
FIG. 1 illustrates an exploded view of an embodiment of the invention.

Some embodiments include the apparatus as shown in FIG. 1. FIG. 1 illustrates an exploded example of a habitable electronic material system 100. The habitable electronic material system 100 may comprise multiple layers to facilitate a techno-centric digital nomadic lifestyle and enable a user to live, learn, and work remotely.

The habitable electronic material system 100 may comprise an energy collection layer 110. The energy collection layer 110 may comprise a solar energy collection system 114. In some embodiments, the solar energy collection systems may comprise a system such as photovoltaic solar cells. In some embodiments, the energy collection layer 110 may comprise a nano-photovoltaic layer, as will be discussed herein below. In some embodiments, the energy collection layer 110 may prevent water from penetrating the habitable electronic material system 100. In some embodiments, the energy collection layer 110 may be waterproof or water resistant. In some embodiments, the energy collection layer 110 may comprise a waterproof layer 116. The waterproof layer 116 may comprise a polymeric waterproof coating, such as an acrylic elastomer. The acrylic elastomer may comprise parylene, which in some embodiments may comprise a thickness of approximately 1 micron. The waterproof layer 116 may act as a barrier to water air while simultaneously allowing light to reach the energy collection layer 110.

In some embodiments, the waterproof layer 116 may comprise a stretchable silicon. A stretchable silicon may provide waterproofing of any seams where materials are joined together or hingeably coupled.

In some embodiments, the waterproofing layer 116 may comprise a flexible aerogel. Some embodiments may include the waterproof layer 116 comprising a combination of the polymeric waterproof coating, the stretchable silicon, and/or the flexible aerogel. Additionally, adhesive layers, which are described in more detail below, may provide additional waterproofing and or water resistance.

In some embodiments, the energy collection layer 110 may be operably coupled with other components of the habitable electronic material system as described herein below.

In some embodiments, the habitable electronic material system 100 may comprise a thermal insulation layer 120. The thermal insulation 120 layer may be bonded to the energy collection layer 110 by adhesive layer 112. The thermal insulation layer 120 may comprise insulation to prevent or slow the transfer of heat from the exterior environment to an interior 102 of the habitable electronic material system 100, or, in some embodiments, to prevent the transfer of heat from the interior 102 of the habitable electronic material system 100 to the exterior environment.

In some embodiments, the habitable electronic material system 100 may comprise an energy storage layer 130 beneath the thermal insulation layer 120. The energy storage layer 130 may be bonded to the thermal insulation layer 120 by an adhesive layer 122. The energy storage layer 130 may comprise a rechargeable device. The energy storage layer 130 may comprise a rechargeable battery device 134. The energy storage layer 130 may comprise an array of battery cells 136 arranged in a distributed fashion over the square footage of the energy storage layer 130. The array of battery cells 136 may be rechargeable. In some embodiments, the energy storage layer 130 may comprise at least one battery.

In some embodiments, the energy storage layer 130 may be operably coupled with the energy collection layer 110 via connections between the energy storage layer 130 and the energy collection lay34 110. The energy storage layer 130 may be operable to store the energy collected by the energy collection layer 110 for use by all components of the habitable electronic material system 100 that may require power or energy, as discussed below.

In some embodiments the habitable electronic material system 100 may comprise an acoustic layer 140. The acoustic layer 140 may be bonded to the energy storage layer 130 and/or thermal insulation layer 120 by adhesive layer 132. The acoustic layer 140 may comprise an acoustic subsystem 144. The acoustic subsystem 144 may comprise a sound output subsystem 146. In some embodiments, the sound output subsystem 146 may comprise speakers and may be user controlled the speakers may be operable to project acoustic signals within the interior 102 and about the exterior of the habitable electronic material system 100. The sound output subsystem 146 may comprise a surround sound system.

In some embodiments, the acoustic subsystem 144 may comprise an array of embedded microphones 148 operable to receive acoustic signals, such as a user's voice, and transmit such acoustic signals to a receiver 149. In some embodiments, the receiver 149 may be operably coupled with the sound output subsystem 146. The receiver 149 may transmit the acoustic signals received from the array of embedded microphones 149 to the speakers of the sound output system 146.

In some embodiments, the array of embedded microphones 148 may be operably coupled to at least one pre-amplifier 147. The at least one pre-amplifier 147 may be operable to amplify an incoming acoustic signal into an output signal strong enough for further processing. The at least one pre-amplifier 147 may be operably coupled with a computer subsystem 164, as described herein below.

In some embodiments the habitable electronic material system 100 may comprise a thermal converter layer 150. The thermal converter layer 150 may be bonded to the acoustic layer 140 by adhesive layer 142. The thermal converter layer 150 may comprise at least one temperature controller 154 in communication with a computer subsystem 164, as described herein below. The at least one temperature controller 154 may be operable to activate heating and or cooling to regulate the temperature on an interior 102 of the habitable electronical material system 100.

In some embodiments, the thermal converter layer 150 may comprise at least one body temperature sensor 156. The at least one body temperature sensor 156 may be in communication with the at least one temperature controller 154 and with the computer subsystem 164.

In some embodiments, the at least one body temperature sensor 156 may face the interior 102 of the habitable electronic material system 100 and may be operable to measure the body temperature of a user or an inhabitant of the habitable electronic material system 100.

In some embodiments, thermal converter layer 150 may comprise at least one infrared (IR) heating element 151. The temperature controller 154 may be operably coupled to the at least one IR heating element 151. In some embodiments, the least one IR heating element 151 may comprise an array of distributed infrared (IR) heating elements 153 embedded in the thermal converter layer 150.

In some embodiments, the thermal converter layer 150 may further comprise a heat pump, operable to provide heating and cooling to the interior 102. In some embodiments, the heat pump may be a Peltier heat pump.

In some embodiments the habitable electronic material system 100 may comprise an optical layer 160. The optical layer 160 may be bonded to the thermal converter layer 160 by adhesive layer 152. The optical layer 160 may comprise an array of lighting 162. The array of lighting may be operable to be user-controlled within the interior 102.

In some embodiments, the optical layer 160 may comprise a user-interface screen 166. In some embodiments, the user-interface screen 166 may extend between 10% and 100% of the interior perimeter or circumference if surface 104. In some embodiments, the user interface screen 166 may extend about the interior 102 of the habitable electronic material system 100 between 25% and 33% of the interior perimeter or circumference. In some embodiments, the user interface screen 166 may extend about the interior 102 of the habitable electronic material system 100 between 33% and 50% of the interior perimeter or circumference. In some embodiments, the user interface screen 166 may extend about the interior 102 of the habitable electronic material system 100 between 50% and 75% of the interior perimeter or circumference. In some embodiments, the user interface screen 166 may extend about the interior 102 of the habitable electronic material system 100 between 75% and 100% of the interior perimeter or circumference.

The user-interface screen 166 may be oriented to face the interior of 102, such that a user may utilize the user interface screen 166 to control various subsystems and/or use the screen for entertainment, work, or other purposes. In some embodiments, the user interface screen 166 may comprise a touch screen responsive to user inputs. The user-interface screen 166 may be operable to be controlled by the user. In some embodiments, the user interface screen 166 may be operable coupled with a computer subsystem 164, which is described herein below.

In some embodiments, the optical layer 160 may further comprise a computer subsystem 164 at least partially embedded in the optical layer 160. The computer subsystem 164 may be operably coupled to each of the energy storage layer 130, the acoustic layer 140, the thermal converter layer 150, and the optical layer 160.

In some embodiments, the computer subsystem 164 may comprise a DC power supply 165 operably coupled with the energy storage layer 130, and specifically, operably coupled with an AC switcher 167 of the energy storage layer 130.

As will be described in detail herein below with reference to FIG. 7, in some embodiments, the computer subsystem may comprise a processor, a memory, and a transceiver. The transceiver may be operable to receive various signals and transmit various signals, for example, signals from an external distributed and integrated communications network, such as the World Wide Web. The transceiver may be operable to receive and transmit information using 5G technology.

In some embodiments, the computer subsystem 164 may comprise a text-to-speech module 168 and a speech-to-text module 169. Each of the text-to-speech module 168 and the speech-to-text module 169 may facilitate communication from and to the user/inhabitant, wherein by voice command or text command, the user may control at least one of the subsystems of the habitable electronic material system. The text-to-speech module 168 may be operable to capture speech from a user and translate the speech to text displayed on a screen via the computer.

In some embodiments, the computer subsystem 164 may comprise a nano-artificial intelligence subsystem 170 or operable access to an artificial intelligence system placed in the cloud.

In some embodiments, the computer subsystem may further comprise a machine learning subsystem 172 in communication with the artificial intelligence subsystem 170.

The artificial intelligence subsystem 170 and the machine learning subsystem 172 may be operable to work either independently or together to learn and adjust to user's preferences within the habitable electronic material system 100. For example, the computer subsystem 164 may be operable to learn any user preferences to autonomously adjust opacity or lighting or display the user's preferred or most commonly used applications, visual graphic displays, and audio during certain activities (which may be detected by motion sensors) and may learn at what time of day the user prefers such conveniences. The artificial intelligence subsystem 170 may receive the user's interior space temperature preference and body temperature data to autonomously adjust the temperature of the interior habitable space, and to alarm or provide guidance when a climatic threat is detected such as extreme hot or cold weather, or to respond to a biological, chemical, or radiological agent threat and provide the user with audio voice or visual text guidance on how the user should respond.

As another example, the artificial intelligence subsystem 170 and/or the machine learning subsystem 172 may be operable to track body movements and facial expressions to detect a user's emotion, such as sadness or anger, and tell the habitable material system to respond with therapeutic preferences such as upbeat or calming sound frequencies and cheerful or soothing color displays.

As an additional example, the artificial intelligence subsystem 170 and/or the machine learning subsystem 172 may be operable to learn the voice of the user to accept voice to text data for user control and user interface, the artificial intelligence subsystem and/or the machine learning subsystem may be operable to recognize voices and/or faces, and store that information in a database that may be accessed to compare potential visitors to such a database in order to verify identities. The artificial intelligence subsystem 170 and/or the machine learning subsystem 172 may be operable to detect intruders for a security sub-system to alarm and call emergency responders or GIS signaling to security forces, ultimately helping to protect the user and to safeguard the user's intellectual assets integrated in the habitable electronic material.

In some embodiments, the computer subsystem 164 may be at least partially embedded into the optical subsystem layer 160.

In some embodiments, the optical subsystem layer 160 may comprise at least one graphics controller 174. The computer subsystem 164 may be in communication with the graphics controller 174 in the optical layer 160. The processor of the computer subsystem may be operably coupled with the at least one graphics controller 174. The at least one graphics controller 174 may be operable to display various system control options to a user. A user may operate various functions of the system 100 via the at least one graphics controller 174.

The optical subsystem layer 160 may further be operably coupled with pre-amplifiers and output amplifiers that may be comprised within the acoustic subsystem layer 140. The pre-amplifiers and output amplifiers may be operably coupled to DC power supplies. Such DC power supplies may be operably coupled with the AC switcher of the energy storage layer 130. The pre-amplifiers, output amplifiers, and the AC switcher may be similar in components and function to other pre-amplifiers, output amplifiers, and AC switchers described herein in reference to other embodiments.

The optical subsystem layer 160 may be operably coupled with the at least one graphics controller 174. The at least one graphics controller 174 may be operably coupled to temperature controllers 154 in the thermal converter/heating and/or cooling subsystem layer and may allow a user to adjust the temperature within the interior 102 of the habitable electronic material system 100.

The optical subsystem layer 160 may further be operably coupled with the at least one graphics controller 174. The at least one graphics controller 174 may be displayed on the optical display user-interface screen 166.

Figure 2:
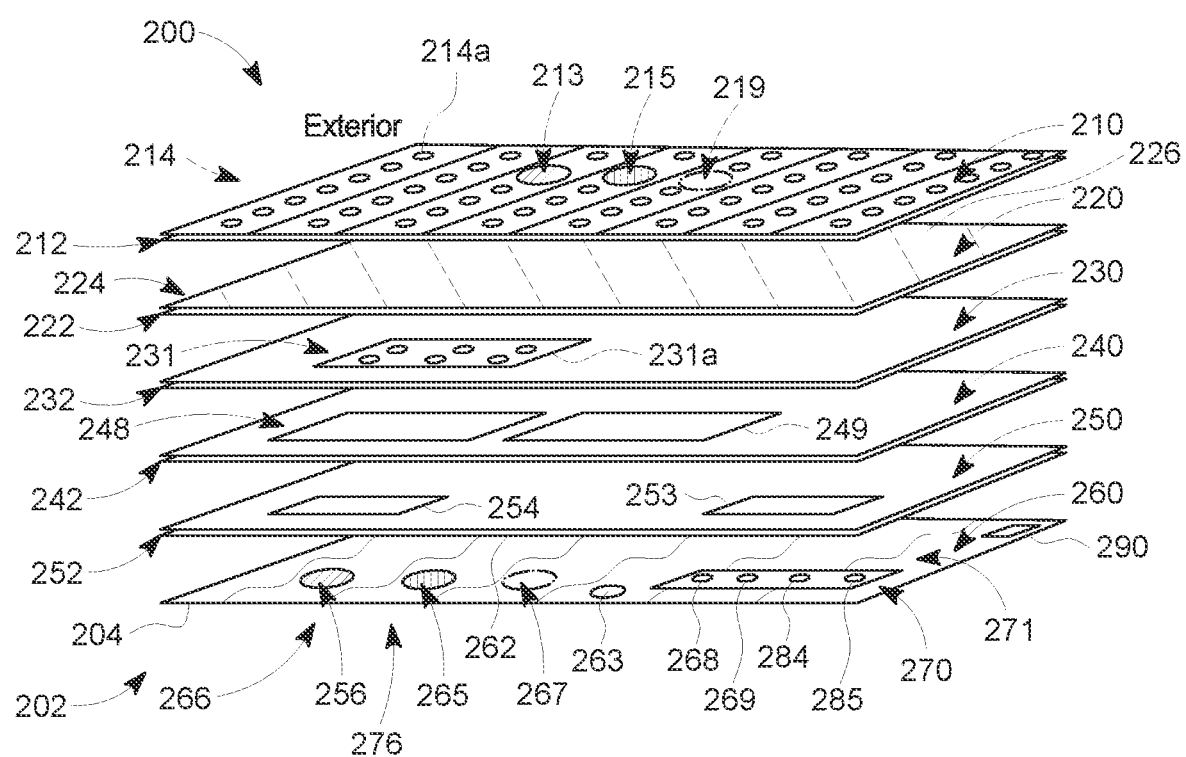
FIG. 2 illustrates an exploded view of an embodiment of the invention.
Figure 3:
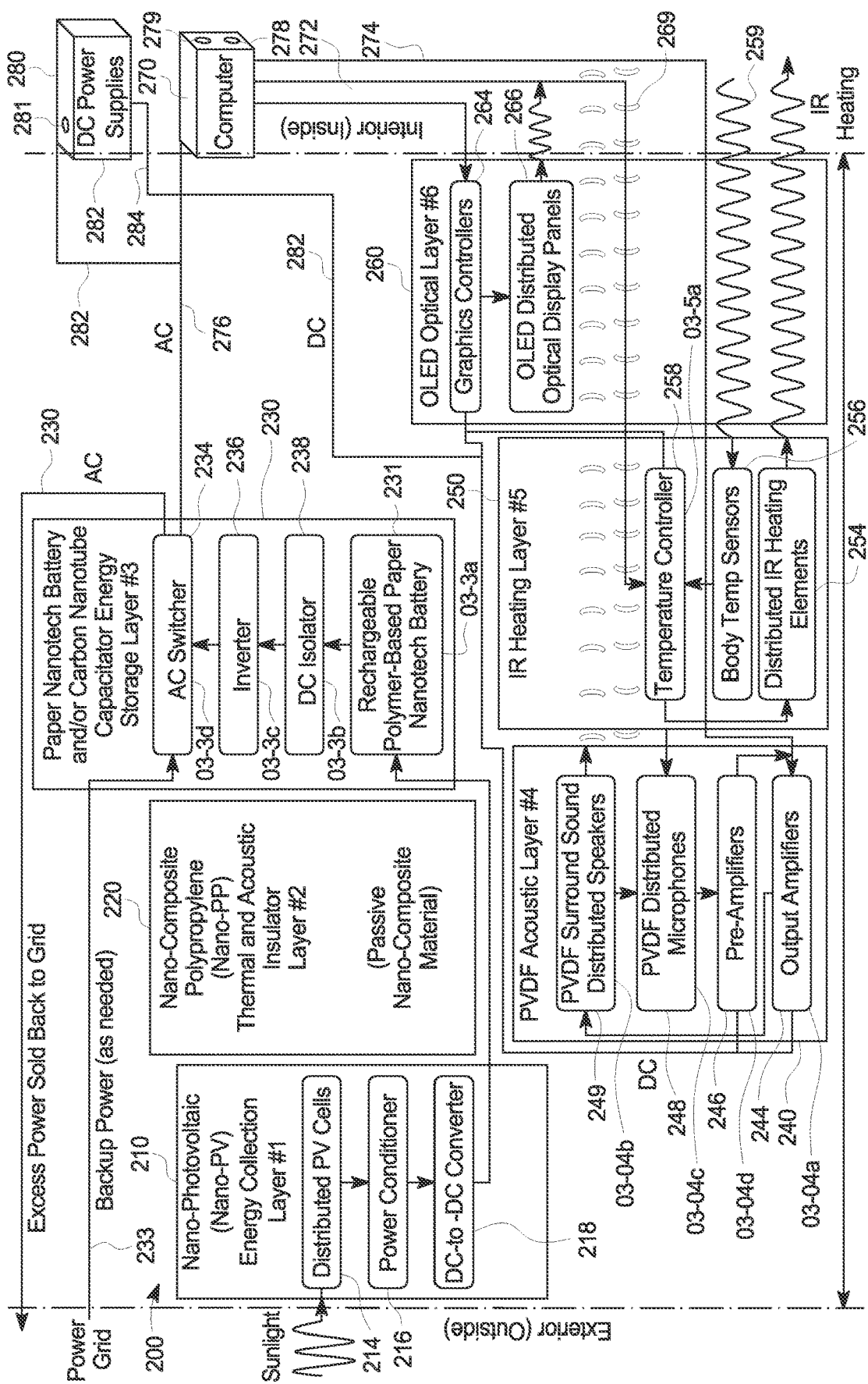
FIG. 3 illustrates diagrammatic flow-chart of an embodiment of the invention.

Some embodiments may comprise the habitable electronic material system as shown in FIG. 2 and FIG. 3. FIG. 2 illustrates a habitable electronic material system 200 having composite layering, and FIG. 3 illustrates the details of the components of the habitable electronic material system 200.

The habitable electronic material system 200 may comprise a nano photovoltaic energy collection subsystem layer 210. The nano photovoltaic energy collection 210 may comprise an array of nano photovoltaic solar cells 214.

The nano photovoltaic energy collection subsystem layer 210 may comprise a substrate with a coating of nanocrystals 214a. The nanocrystal substrate 214a may be based on silicon, CdTe, or CIGS. The nanocrystal substrate 214 may generally comprise silicon, or various other organic conductors.

In some embodiments, the nano photovoltaic energy collection subsystem layer 210 may cover the surface area of the entire exterior of the habitable electronic material system 200. In some embodiments, the nano photovoltaic energy collection subsystem layer 210 may partially cover the surface area of the exterior of the habitable electronic material system 200. For example, the in some embodiments, when the habitable electronic material system 200 is set up or erected, the nano photovoltaic energy collection subsystem layer 210 may cover an upper half or an upper three-quarters (¾) of the surface area of the exterior of the habitable electronic material system 200.

In some embodiments, the nano photovoltaic energy collection subsystem layer 210 may prevent water from penetrating the habitable electronic material system 200. In some embodiments, the energy collection layer 210 may be waterproof or may comprise a waterproof layer or coating similar to other waterproof coatings or layers described herein in relation to other embodiments.

In some embodiments, the energy collection layer 210 may comprise various other components that add functionality to the system 200. For example, in some embodiments, a global positioning sensor (GPS) sensor 213 may be coupled on or within the energy collection layer 210. The GPS sensor 213 may be operably coupled with the computer subsystem 270, which is described herein below. The GPS sensor 213 may receive and send GPS coordinates from/to the computer subsystem 270 or from/to other systems, such as satellite systems. The GPS sensor 213 may be operably coupled with the energy storage layer 230, which is described herein below, and receive energy from the energy storage layer 230.

In some embodiments, the energy collection layer 210 may be coupled with an optical sensor 215. The optical sensor 215 may capture still images and/or video of the surrounding environment. The optical sensor 215 may be operably coupled with the computer subsystem 270, which is described herein below. The optical sensor 215 may receive and send optical signals from/to the computer subsystem 270. The optical sensor 215 may be operably coupled with the energy storage layer 230, which is described herein below, and receive energy from the energy storage layer 230.

In some embodiments, the energy collection layer 210 may be coupled with a motion detector 219. The motion detector 219 may detect motion within the surrounding environment. The motion detector 219 may be operably coupled with the computer subsystem 270, which is described herein below. The motion detector 219 may receive and send optical signals from/to the computer subsystem 270. The computer subsystem 270 may provide a notification to a user of certain motions within the surrounding environment. The motion detector 219 may be operably coupled with the energy storage layer 230, which is described herein below, and receive energy from the energy storage layer 230.

In some embodiments, the energy collection layer 210 may be operably coupled with other components of the habitable electronic material system 200, as described herein.

In some embodiments, the habitable electronic material system 200 may comprise a thermal insulation layer 220. The thermal insulation layer 220 may be bonded to the energy collection layer 210 via adhesive layer 212. The thermal insulation layer 220 may comprise a nano-composite polypropylene material 224. The nano-composite polypropylene material 224 may comprise polypropylene-based nanocomposite materials 226, which have longer life and improved aging stability than other materials used for thermal insulation purposes. The nano-composite polypropylene material 224 of the thermal insulation layer 220 may comprise improved thermal retention properties and may be more environmentally friendly than traditional alternative thermal insulators.

In some embodiments, the habitable electronic material system 200 may comprise an energy storage layer 230 beneath the thermal insulation layer 220. The energy storage layer 230 may be coupled to the thermal insulation layer 220 by adhesive layer 222. In some embodiments, the energy storage layer 230 may comprise a rechargeable device, such as for example, a rechargeable polymer-based paper battery 23. The rechargeable polymer-based paper battery 231 may comprise a combination of carbon nanotubes with conventional sheets of cellulose-based paper. The rechargeable polymer-based paper battery 231 may be thin and lightweight, as compared to other types of batteries.

The rechargeable polymer-based paper battery 231 may comprise an array of paper-based battery cells 231a arranged in a distributed fashion over the square footage of the energy storage layer 230, such as an array of battery cells.

In some embodiments, the energy storage layer 230 may be operably coupled with the energy collection layer 210. The energy storage layer 230 may be operable to store the energy collected by the energy collection layer 210 for use by all components of the habitable electronic material system 200 that may require power or energy, as discussed below.

In some embodiments the habitable electronic material system 200 may comprise an acoustic layer 240. The acoustic layer 240 may be bonded to the energy storage layer 230 via the adhesive layer 232. As described in more detail below in reference to FIG. 3, the acoustic layer 240 may comprise an acoustic subsystem for user-controlled surround sound system output and acoustic distributed microphones input.

The acoustic layer 240 may comprise poly vinyl difluoride (PVDF) components, as shown in FIG. 3. The acoustic layer 240 may comprise PVDF surround sound distributed speakers 249. In some embodiments, the acoustic layer 240 may comprise acoustic transducers with integrated speakers and microphones. The acoustic layer 240 may comprise an array of embedded microphones 248 operable to receive acoustic signals, such as a user's voice, and transmit such acoustic signals to a receiver, as discussed herein below. The acoustic layer 240 may further comprise an array of speakers operable to project acoustic signals within the habitable electronic material system 200. The PVDF layer may comprise embedded micro-speakers and micro-microphones.

The acoustic layer 240 may further comprise an array of distributed microphones operably coupled to pre-amplifiers 246 as shown in FIG. 3. The pre-amplifiers may be operably coupled with the computer subsystem 270.

In some embodiments the habitable electronic material system 200 may comprise a thermal converter layer 250. The thermal converter layer 250 may be bonded to the acoustic layer 240 via the adhesive layer 242. As described in further detail below with reference to FIG. 3, the thermal converter layer 250 may comprise an infra-red (IR) heating element. The thermal converter layer 250 may be the layer that is the thickest layer of all layers in the habitable electronic material system 200. The thermal converter layer 250 may be operable to provide heating and/or cooling to the interior 202.

The thermal converter layer 250 may comprise at least one temperature controller 258, as shown in FIG. 3 in communication with a computer subsystem 270, as discussed below.

In some embodiments, thermal converter layer 250 may comprise at least one infrared (IR) heating element 254, as illustrated in FIG. 3. The temperature controller 258 may be operably coupled to the at least one IR heating element 254. In some embodiments, the least one IR heating element may comprise an array of distributed infrared (IR) heating elements embedded in the thermal converter layer 250.

In some embodiments, the thermal converter layer 254 may comprise a heat pump 253, as shown in FIG. 3. The heat pump 253 may comprise a thermoelectric heat pump operably coupled with the at least one temperature controller 258. The heat pump 253 may comprise a flexible heat pump or exchanger operable to provide heating or cooling to the habitable interior space 202. Some embodiments may comprise a heat pump that may be used for heating and/or cooling.

In some embodiments the habitable electronic material system 200 may comprise an optical layer 260. The optical layer 260 may be bonded to the thermal converter layer 250 by the adhesive layer 252. The optical layer 260 may comprise an array of lighting 262. The optical layer 260 may be operable to facilitate user-control of the array of lighting 262 within the habitable electronic material system 200. The optical layer 260 may comprise a user-interface screen 276 facing the interior 202 of the habitable electronic material system operable to be controlled by the user; the user interface screen 276 may cover part of or all of the interior facing layer 204 of the habitable electronic material system 200.

In some embodiments, the user interface screen 276 may extend about the interior 202 of the habitable electronic material system 200 between 10% and 100% of the interior perimeter or circumference. In some embodiments, the user interface screen 276 may extend about the interior 202 of the habitable electronic material system 200 between 25% and 33% of the interior perimeter or circumference. In some embodiments, the user interface screen 276 may extend about the interior 202 of the habitable electronic material system 200 between 33% and 50% of the interior perimeter or circumference. In some embodiments, the user interface screen 276 may extend about the interior 202 of the habitable electronic material system 200 between 50% and 75% of the interior perimeter or circumference. In some embodiments, the user interface screen 276 may extend about the interior 202 of the habitable electronic material system 200 between 75% and 100% of the interior perimeter or circumference.

The adhesive layers described herein may permanently or temporarily couple adjacent layers as described herein. Adjacent layers are generally laid one on top of the other to be sandwiched together by a variety of chemical, ionic or adhesive bonding, and/or fasteners that will add minimal weight to the total weight of the system. The adhesives that may be used for the invention may include a highly flexible two component epoxy compound (EP40), or a single component epoxy (EP13).

In some embodiments, the optical layer 260 and the user interface screen 276 may comprise an organic light emitting diode (OLED) layer 266, as described herein in reference to FIG. 3. The OLED layer 266 may comprise an emissive electroluminescent layer that is a film of organic compound that may emit light in response to a received electric current. The organic compound may be situated between two electrodes. In some embodiments, at least one of these electrodes may be transparent. The optical layer 260 may create the at least one digital display that functions as at least one of television screen, computer monitor, and portable system such as a smartphone or handheld game console without needing these separate devices; the OLED layer 266 may create a multifunctioning display screen/monitor as an all-in-one solution.

In some embodiments, the optical layer 260 may be operably coupled with the computer subsystem 270. In some embodiments, the computer subsystem 270 may be at least partially embedded in the optical layer 260. The computer subsystem 270 may be operably coupled to each of the energy storage layer 230, the acoustic layer 240, the thermal converter layer 250, and the optical layer 260.

In some embodiments, the computer subsystem 270 may comprise a system on silicon interconnect fiber 271. In embodiments comprising the silicon interconnect fiber 271, the computer subsystem 270 may be distributed throughout the silicon interconnect fiber 271 across the habitable electronic material subsystem 200 and may be more integrated or woven into the habitable electronic material system 200, which may allow more even distribution of the weight of the computer subsystem 270. Although the silicon interconnect fiber 271 is shown in FIG. 2 as being distributed across the optical layer 260, embodiments may comprise wherein the silicon interconnect fiber 271 is distributed across multiple layers of the habitable electronic material system 200. In some embodiments, the computer 270 may further comprise a command-and-control link 279. The command-and-control link 279 may be operably coupled with the silicon interconnect fiber 271 and may be a database input/output and may be configured for a 5G connection.

In some embodiments, the computer subsystem 270 may be operably couple with a DC power supply 280, as shown in FIG. 3, operably coupled with the energy storage layer 230, and specifically, operably coupled with an AC switcher 234, of the energy storage layer 230.

In some embodiments, the computer subsystem 270 may comprise a processor, a memory, and a transceiver, as will be described herein below in reference to FIG. 7. The transceiver may be operable to receive various signals and transmit various signals, for example, signals from an external distributed and integrated communications network, such as the World Wide Web.

In some embodiments, the computer subsystem 270 may comprise a text-to-speech communication module 268 and speech-to-text communication module 269 that may facilitate the translation between text-to-speech and speech-to-text with the user/inhabitant. The components and functionality of the text-to-speech communication module 268 and speech-to-text communication module 269 are similar to the components and functionality described herein above with respect to other embodiments.

In some embodiments, the computer subsystem 270 may comprise a nano-artificial intelligence subsystem 284 that may be operable access to an artificial intelligence system placed in the cloud. The components and functionality of the nano-artificial intelligence subsystem 284 are similar to the components and functionality described herein above with respect to other embodiments.

In some embodiments, the computer subsystem 270 may further comprise a machine learning subsystem 285 in communication with the artificial intelligence subsystem 284. The components and functionality of the machine learning subsystem 285 are similar to the components and functionality described herein above with respect to other embodiments.

As shown in further detail in FIG. 3, in some embodiments, the optical layer 260 may comprise at least one graphics controller 264. The computer subsystem 270 may be in communication with graphics controllers 264 in the optical layer 260. The processor of the computer subsystem may be operably coupled with the at least one graphics controller.

The optical layer 260 may further comprise wherein the at least one graphics controller 264 in communication with pre-amplifiers 246 and output amplifiers 244 that are in an acoustic subsystem layer. The pre-amplifiers 244 and output amplifiers 246 may be operably coupled to DC power supplies 280. The DC power supplies 289 may be operably coupled with the AC switcher 234 of the energy storage layer 230.

The optical subsystem layer 260 may further comprise graphics controllers 264 operably coupled to temperature controllers 258 in the thermal converter layer 250.

The optical subsystem layer 260 may further comprise graphics controllers 264 operably coupled to the optical display surround user-interface screen 276.

In some embodiments, the optical subsystem layer 260 may comprise various other components that add functionality to the system 200. For example, in some embodiments, a global positioning sensor (GPS) sensor 263 may be coupled on or within the optical subsystem layer 260. The GPS sensor 263 may be operably coupled with the computer subsystem 270 and may be operably coupled with the GPS sensor 213. The GPS sensor 263 may receive and send GPS coordinates from/to the computer subsystem 270 or from/to other systems, such as satellite systems. The GPS sensor 263 may be operably coupled with the energy storage layer 230 and receive energy from the energy storage layer 230.

In some embodiments, the optical subsystem layer 260 may be coupled with an optical sensor 265. The optical sensor 265 may capture still images and/or video of the surrounding environment. The optical sensor 265 may be operably coupled with the computer subsystem 270. The optical sensor 265 may receive and send optical signals from/to the computer subsystem 270. The optical sensor 265 may be operably coupled with the energy storage layer 230 and receive energy from the energy storage layer 230.

In some embodiments, the optical subsystem layer 260 may be coupled with a motion detector 267. The motion detector 267 may detect motion within the interior 202 of the habitable electronic material system 200. The motion detector 267 may be operably coupled with the computer subsystem 270. The motion detector 267 may receive and send optical signals from/to the computer subsystem 270. The computer subsystem 270 may record and track the motions from the motion detector 267. The motion detector 267 may be operably coupled with the energy storage layer 230 and receive energy from the energy storage layer 230.

Referring now to FIG. 3, a diagrammatic flow-chart of the operation of the invention is illustrated herein. FIG. 3 illustrates several details described about with reference to FIG. 2.

In some embodiments, the energy collection layer 210, may comprise a nano-photovoltaic array layer of solar cells 214. The nano-photovoltaic array 214 may collect energy from the sun for conversion to electricity.

The nano-photovoltaic array 214 may pass the energy or electricity collected from the sun to a power conditioner 216. The power conditioner 216 may be configured to smooth out and provide voltage to various components of the habitable electronic material system 200. In some embodiments, the energy collection layer 210 may comprise multiple power conditioners 216 to accommodate different components within the habitable electronic material system 200.

In some embodiments, the electricity that has passed through the power conditioner 216 may be passed to a DC-to-DC converter 218. The DC-to-DC converter 218 may convert the electricity from one voltage to another voltage, either higher or lower, in order to accommodate various components within the habitable electronic material system 200.

In some embodiments, the thermal insulation layer 220 comprising a nanocomposite polypropylene layer may act as a thermal and acoustic insulator. In some embodiments, the nano-composite polypropylene material may be a passive nanocomposite material.

In some embodiments, the DC-to-DC Converter 218 may send energy to the energy storage layer 230. As discussed above, the energy storage layer 230 may comprise a rechargeable polymer-based paper nanotechnology battery 231. The rechargeable polymer-based paper nanotechnology battery 231 may store energy for use by the various components within the habitable electronic material system 200.

In some embodiments, the rechargeable polymer-based paper nanotechnology battery 231 may send energy to DC isolator 238. The DC isolator 231 may be operable to isolate a circuit or component of the habitable electronic material system 200. The DC isolator 231 may comprise an input to receive the energy or electricity from the rechargeable polymer-based paper nanotechnology battery 231. In some embodiments, the DC isolator 231 may comprise a switch operable to open and close. When in the open position, the switch may isolate a particular circuit or component. In some embodiments, the DC isolator 231 may further comprise an output operably coupled to the switch, and operable to output the energy or electricity as described below. In some embodiments, the DC isolator 231 may be operable to isolate multiple circuits and/or components.

In some embodiments, the DC isolator 231 may be operable to output, via the output, the energy or electricity to inverter 236. The inverter 236 may convert the DC electricity received from the DC isolator to alternating current (AC).

In some embodiments, the inverter 236 may, after converting the energy or electricity to AC may send the energy to an AC switcher 234. In some embodiments, the AC switcher 234 may be operably coupled with a power line 233 connected to a traditional power grid via connection 234 to provide backup power to the habitable electronic material system 200. The AC switcher 234 may switch the source of power from the rechargeable polymer-based paper nanotechnology battery 231 to any different power source, such as the traditional power grid or supercharger station. The AC switcher 234 may be operably coupled with a power sensor to determine the power needs of the habitable electronic material system 200. The AC switcher 234 may further comprise a switch, responsive to the connection with the power sensor and operable to switch the power source from the traditional grid to the rechargeable polymer-based paper nanotechnology battery 231 or vice-a-versa.

In some embodiments, the habitable electronic material system 200 may produce more power than it requires to operate, as determined by a computer, as described below. The AC switcher 234 may be operable to switch from receiving energy to sending energy to the grid via connection 239. The energy returned to the grid may be sold to the power company.

In some embodiments, the AC switcher 234 may send electricity through an analog converter 237. The AC switcher 234 may send electricity to stand alone and/or embedded DC power supplies, as represented by DC power supply 280. In some embodiments, the DC power supply 280 may comprise the energy collection layer 210. In some embodiments, the DC power supply may comprise the electricity received from a public or private utility grid at connection 281. In some embodiments, the AC switcher 234 may send electricity to the computer subsystem 270.

In some embodiments the habitable electronic material system 200 may comprise a computer subsystem 270. The computer subsystem 270 may be operably connected with multiple components throughout the habitable electronic material system 200, as will be discussed herein below.

In some embodiments, as discussed above, the habitable electronic material system 200 may comprise a polyvinyl difluoride (PVDF) acoustic layer 240. The PVDF acoustic layer 240 may comprise at least one output amplifier 244. The DC Power Supplies 280 may send electricity through Digital Converter 282. to Output Amplifiers 244 in PVDF Acoustic layer 240.

In some embodiments, the PVDF acoustic layer 240 may comprise at least one pre-amplifier 246. The at least one pre-amplifier 246 may comprise PVDF components operable to boost received acoustic signals.

In some embodiments, the PVDF acoustic layer 240 may comprise PVDF distributed microphones 248, operable to receive and transmit acoustic signals from within and from without the habitable electronic material system 200.

In some embodiments, the PVDF acoustic layer 240 may comprise PVDF surround sound distributed speakers 249, operable to project sound within the interior 202 of the habitable electronic material system 200.

In some embodiments, the PVDF distributed speakers 249 may be operably coupled with the computer subsystem 270 and may project signals received from the computer subsystem 270.

In some embodiments, the at least one output amplifier 244 may send energy or a signal to at least one of Poly Vinyl Difluoride (PVDF) Surround Sound Distributed Speakers/Acoustic Transducers 249 with integrated speakers. In some embodiments, the PVDF surround sound speakers may comprise miniature speakers. The miniature speakers may be embedded within the fabric layer of PVDF acoustic layer 240. The speakers 249 may send sound to the interior environment of the habitable electronic material system 200.

In some embodiments, the PVDF acoustic layer 240 may comprise PVDF distributed microphones 248, operable to project sound within the interior 202 of the habitable electronic material system 200.

In some embodiments, sound waves may also be sent from the interior 202 of the habitable electronic material system 200 to the PVDF distributed microphones 248. In some embodiments, the output amplifier 244 may send energy or a signal to at least one PVDF distributed microphone 248. In some embodiments the at least one PVDF distributed microphone may comprise miniature microphones.

In some embodiments, the PVDF distributed microphones 248 may be operable coupled with the computer subsystem 270 and may communicate captured acoustic signals. The computer subsystem 270 may transmit or record the acoustic signals. The acoustic signals may include a person's speech, music, environmental sounds, and others.

In some embodiments, the habitable electronic material system 200 may comprise, as discussed above, an infrared heating layer (IR heating layer) 250. The IR heating layer may comprise a temperature controller 258. The temperature controller 258 may be operable to sense the temperature of the interior 202 of the habitable electronic material system 200. The temperature controller 258 may be operably coupled with the computer subsystem 270 and may communicate the interior temperature to the computer subsystem 270. The temperature controller 258 may be operable to receive instruction from the computer subsystem 270 regarding what the desired temperature of the interior 202 of the habitable electronic material system may be. Alternatively, the temperature controller 258 may be operable to receive direct user input regarding the desired temperature.

In some embodiments, the IR heating layer 250 may comprise at least one IR heating element 254. The at least one IR heating element 254 may be operable to produce heat to heat waves 259 to provide warmth to the interior 202 of the habitable electronic material system 200. The at least one IR heating element 254 may be operably coupled with the temperature controller 258. The at least one IR heating element 250 may be responsive to instruction received from the temperature controller 258 regarding heating the interior 202 of the habitable electronic material system 200. In some embodiments, the at least one IR heating element may comprise an array of distributed IR heating elements 254, distributed at least partially over the IR heating layer 250.

In some embodiments, the IR heating layer 250 may comprise at least one body temperature sensor 256. The at least one body temperature sensor 256 may receive temperature data from an occupant or occupants of the interior 202 of the habitable electronic material system 200. The at least one body temperature sensor 256 may be operably coupled with the computer subsystem 270 and may transmit temperature information to the computer subsystem 270. The computer subsystem 270 may communicate the body temperature information to an external location or server if the temperature data indicates a problem. In some embodiments, for example, if a body temperature were low, the computer subsystem 270 could provide instruction to the temperature controller 258 to turn on and heat the interior 202 of the habitable electronic material system 200.

In some embodiments, the habitable electronic material system 200, as discussed above, may comprise organic light emitting diode (OLED) layer 260. The OLED layer may comprise the emissive electroluminescent layer is a film of organic compound that may emit light in response to a received electric current. The OLED layer 260 may create digital displays in devices such as television screens, computer monitors, and portable systems such as smartphones and handheld game consoles. The OLED layer 260 may comprise a graphics controller 264 operably coupled with the computer subsystem 270. The computer subsystem 270 may send signals to the graphics controller for display. The signals may include video conferencing, entertainment, backgrounds, and other video or photographic displays.

In some embodiments, the OLED layer 260 may further comprise at least one OLED optical display panel 266. The at least one optical display panel 266 may comprise multiple display panels distributed across the OLED layer 260. The optical display panel 266 may be operably coupled with the graphics controller 266 and may receive signals to control the display on the at least one display panel 266. The graphics controller 264 may also send energy or electricity to the at least one OLED optical display panel.

In some embodiments, the optical layer 260 may further comprise the computer subsystem 270 being at least partially embedded in the optical layer 260. The computer subsystem 270 may be operably coupled to each of the energy storage layer 230, the acoustic layer 240, the thermal converter layer 250, and the optical layer 260, as discussed herein. In some embodiments, the computer subsystem 270 may also send energy or electricity through the digital converter 282 to various components, including the at least one output amplifier 244 and the graphics controller 264.

In some embodiments, the computer subsystem 270 may comprise a transceiver, as will be explained herein below. The transceiver may be operable to receive communications from an external source or server and may be operable to receive communications from an external source or server. The computer subsystem 270 may be operable connected to a distributed network such as the World Wide Web, the internet, or an intranet.

In some embodiments, the habitable material electronic system 200 may be operable to couple with an existing apparatus. For example, the habitable material electronic system 200 may be operable to couple with at least one other habitable electronic material system. Multiple systems, such as the energy collection layer, the thermal converter layer, layer, the energy storage layer, the acoustic layer, or the computer subsystem may couple with other habitable electronic material systems or with other existing apparatuses, such as a power source, a network connection, a heat source, or other existing apparatus.

In some embodiments, the computer subsystem 200 may be operable to couple with a brain-computer interface at receiver 278, which may allow a user to control the habitable material electronic system 200 using only their thoughts. The brain-computer interface may be a commercially available brain-computer interface, such as Neuralink® and may be operable to interpret a user's thoughts into executable commands while receiver 278 is operable to receive the commands and communicate the commands to the computer 270.

In some embodiments, the habitable electronic material device 200 may comprise medical peripheral 290. The medical peripheral 290 may comprise a life support system, such as a life support oxygen system, such as a respirator or other oxygen device, operable to provide oxygen to a user in the event that a lack of oxygen is present or if a user is not breathing. The medical peripheral 290 may further comprise an alarm and emergency personnel contact system, a defibrillator, or other apparatus to stimulate and sustain a user's life until emergency responders can provide assistance.

The habitable electronic material system 200 may be designed to be mobile and packable, such that a user may transport the habitable electronic material system 200, for example, on one's back.

The following table illustrates the thickness that each layer of the habitable electronic material system 200 may comprise and the total thickness that the system 200 may comprise.

| Habitable Electronic Material System Layer | Approximate Thickness Range | Thickness in some embodiments |
| --- | --- | --- |
| Nano-Photovoltaic Layer 210 | 0.110 mm-0.120 mm | 0.115 mm |
| Nano-Composite Polypropylene Layer 220 | 0.095 mm-0.105 mm | 0.100 mm |

-continued

| Habitable Electronic Material System Layer | Approximate Thickness Range | Thickness in some embodiments |
|---|---|---|
| Rechargeable Polymer-based paper Battery Layer 230 | 0.119 mm-0.129 mm | 0.124 mm |
| PVDF Layer 240 | 0.025 mm-0.035 mm | 0.030 mm |
| IR Heating Layer 250 | 0.025 mm-0.130 mm | 0.100 mm |
| OLED Layer 260 | 0.095 mm-0.105 mm | 0.100 mm |
| Adhesive Layers | 0.015 mm-0.025 mm | 0.020 mm |
| Total Approximate Thickness of Habitable Electronic Material System | 0.459 mm-0.649 mm | 0.5 mm or 0.0197 inches |

In some embodiments, the habitable electronic material system 200 may comprise the following approximate weights per square foot:

| Habitable Electronic Material System Layer | Weight in some embodiments |
|---|---|
| Nano-Photovoltaic Layer 210 | 0.040 lb/sq. ft |
| Nano-Composite Polypropylene Layer 220 | 0.035 lb/sq. ft |
| Rechargeable Polymer-based paper Battery Layer 230 | 0.083 lb/sq. ft |
| PVDF Layer 240 | 0.010 lb/sq. ft |
| IR Heating Layer 250 | 0.050 lb/sq ft |
| OLED Layer 260 | 0.010 lb/sq. ft |
| Adhesive Layers | 0.035 lb/sq. ft |
| Total Approximate Weight of 64 sq. ft. (8 ft × 8 ft) of Habitable Electronic Material System | Approximately 14 lbs |
| Total Approximate Weight of 64 sq. ft. (8 ft × 8 ft) of Habitable Electronic Material System | Approximately 75 lbs |

In some embodiments, the habitable electronic material system 200 may comprise a flexible sheet of material comprised of a set of layers of nanocomposite sheets, textiles sheets, matrixes and solid form sheets, sandwiched together to form one network skin that can be manipulated to take the shape of flat planes, curved planes, complex curves, domes, and a variety of enclosing shapes that can be collapsed, rolled up or folded in a variety of ways for ease of shipping, transport, or shell-back transport.

In some embodiments, the habitable electronic material system 200 may comprise at least one set of pneumatic ribs on an inner surface or on an outer surface of the habitable electronic material system 200. The pneumatic ribs may be filled by a pump and may be filled with atmospheric air. The pneumatic ribs may be operable to provide structural support to the habitable electronic material system 200. In some embodiments, the habitable electronic material system 200 may self-erect by using photovoltaic energy. In some embodiments, the habitable electronic material system 200 may be set up by use of metamaterials having flexibility and shape recovery.

The configurations described above may result, in some embodiments, in a structure that is collapsible. Such a collapsed structure may be mobile and transportable. Such a collapsed structure may comprise straps that a user may utilize to transport the habitable electronic material system 200 in order to support a techno-nomadic lifestyle as a digital nomad. Such collapsed structure may be sized and configured to be transported by an average individual without external aid. Such configurations are illustrated herein below.

Figure 4:
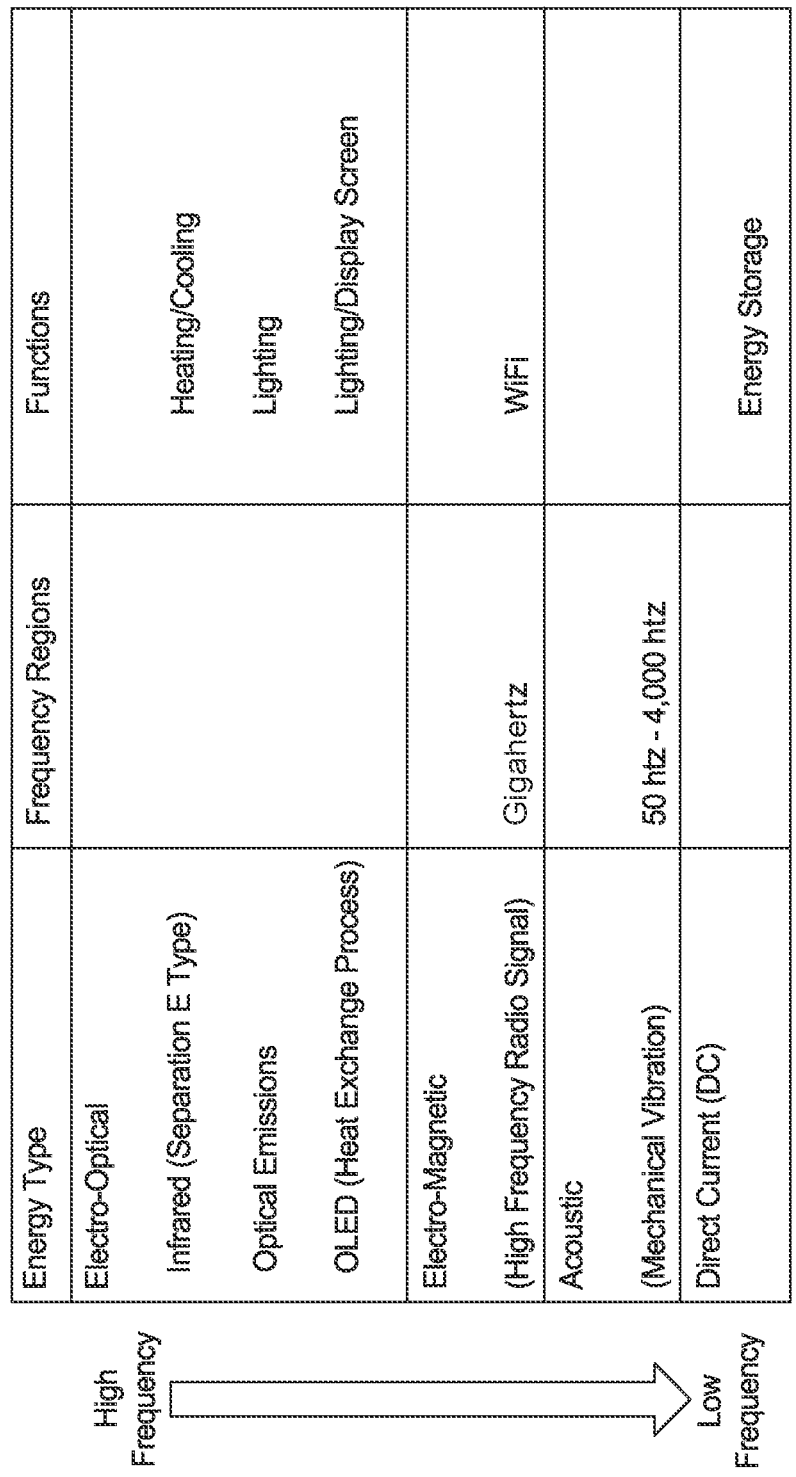
FIG. 4 illustrates a table describing various aspects of the invention.

FIG. 4 illustrates a table showing how the various frequencies of the energies of the required systems compare.

FIGS. 5a-5e illustrate various details and further components included in some embodiments and functionality that may be present in certain embodiments of the invention.

Figure 6:
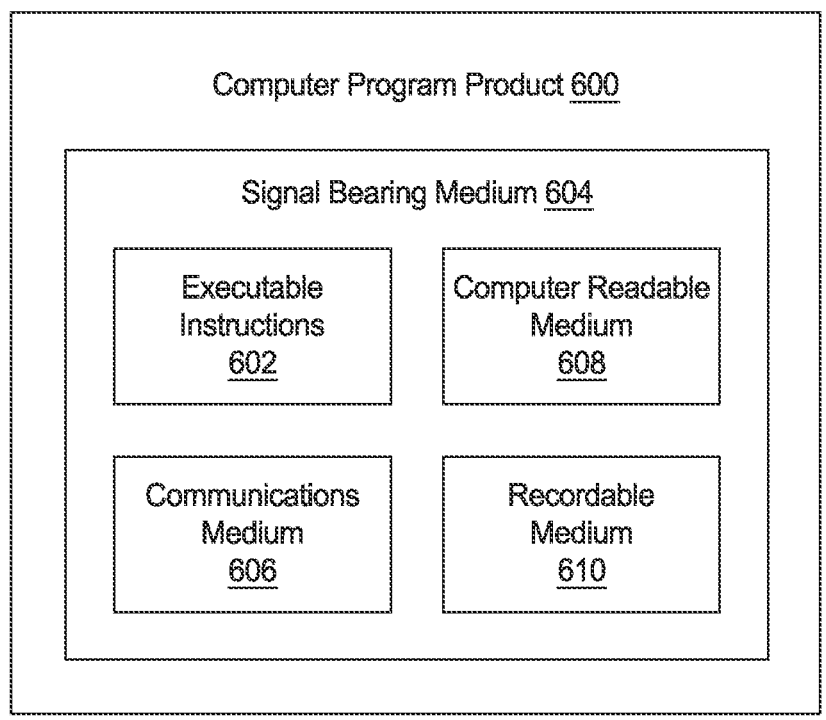
FIG. 6 illustrates a computer program product for use with the embodiments described herein.

FIG. 6 illustrates an exemplary computer program product 600 that is configured to provide instruction and execution of various living arrangements, in accordance with various embodiments of the present invention.

The computer program product 600 may correspond to an energy collection and distribution program product stored in the memory of computer subsystem 270 or a program product stored in the form of processor executable instructions stored in computer subsystem 270.

Computer program product 600 may include a signal bearing medium 604. Signal bearing medium 604 may include one or more instructions 602 that, when executed by, for example, a processor or controller, may provide the functionalities described above to provide an organization and storage system.

In some implementations, signal bearing medium 604 may encompass a computer-readable medium 608, such as, but not limited to, a hard disk drive, a Compact Disc (CD), a Digital Video Disk (DVD), a digital tape, memory, etc. In some implementations, signal bearing medium 604 may encompass a recordable medium 610, such as, but not limited to, memory, read/write (R/W) CDs, R/W DVDs, etc. In some implementations, signal bearing medium 604 may encompass a communications medium 606, such as, but not limited to, a digital and/or an analog communication medium (e.g., a fiber optic cable, a waveguide, a wired communications link, a wireless communication link, etc.). Thus, for example, program product 600 may be conveyed to one or more components of the control units within the system 100 or the system 200 via an RF signal bearing medium 604, where the signal bearing medium 604 is conveyed by a wireless communications medium 606 (e.g., a wireless communications medium conforming with the IEEE 802.11 standard).

Figure 7:
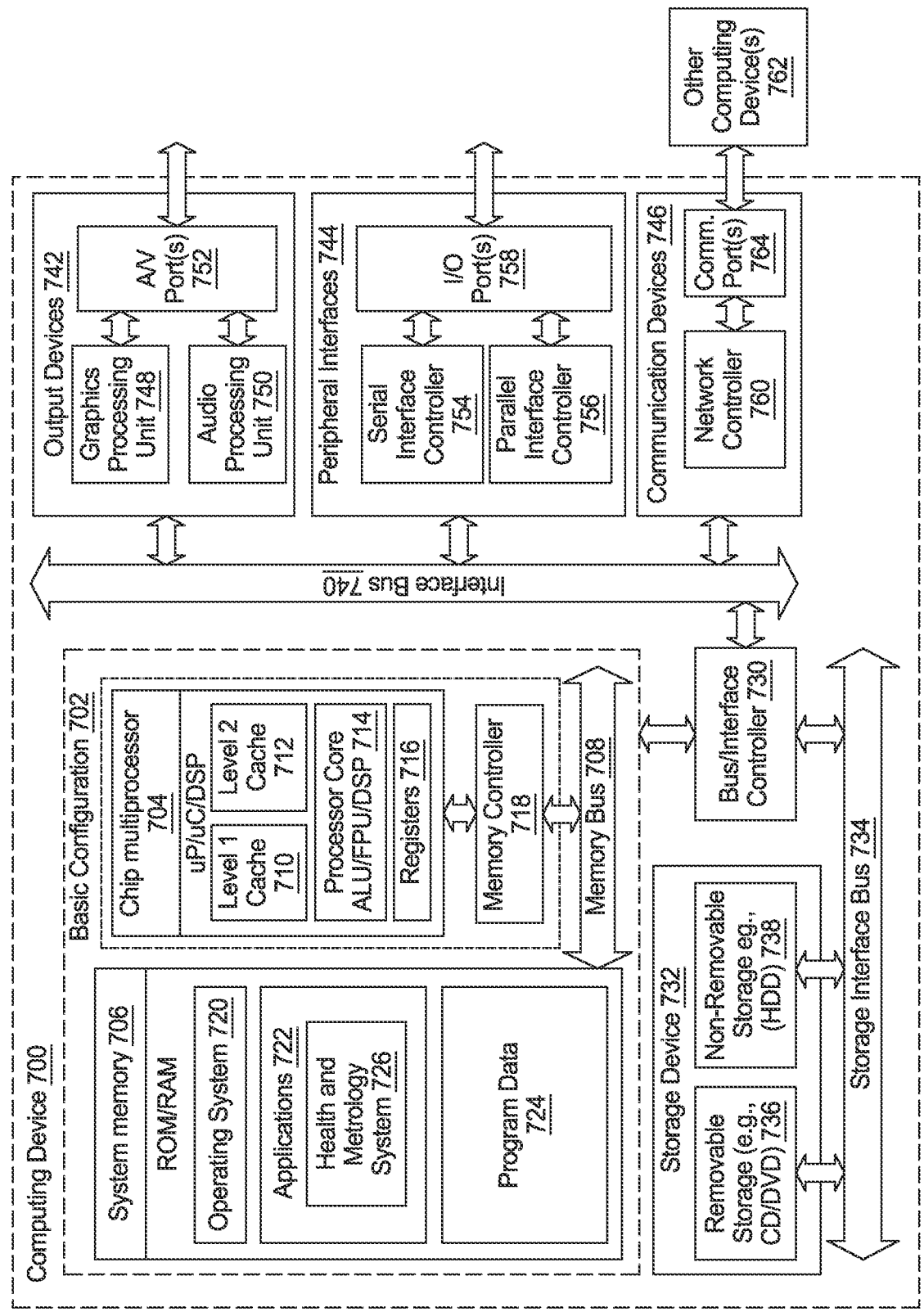
FIG. 7. illustrates a block diagram illustrating a computing device.

FIG. 7 is a block diagram illustrating an exemplary computing device that is configured to provide a storage and organization system, in accordance with various embodiments of the present invention. In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (p,P), a microcontroller (piC), a digital signal processor (DSP), or any combination thereof. Processor 704 may include one or more levels of caching, such as a level one cache 710 and a level two cache 712, a processor core 714, and registers 716. An example processor core 714 may include an arithmetic logic unit (ALU), a floating-point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof System memory 706 may include an operating system 720, one or more applications 722, and program data 724. Application 722 may include a document interaction evaluation algorithm 726 that is arranged to perform the functions as described herein including those described with respect to system 100 of FIGS. 1-6. Program data 724 may include document interaction evaluation data 728 that may be useful for implementation of a document interaction evaluator based on an ontology as is described herein. In some embodiments, application 722 may be arranged to operate with program data 724 on operating system 720 such that implementations of evaluating interaction with document based on ontology may be provided. This described basic configuration 702 is illustrated in FIG. 7 by those components within the inner dashed line.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable, and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information, and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more AN ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

Figure 8:
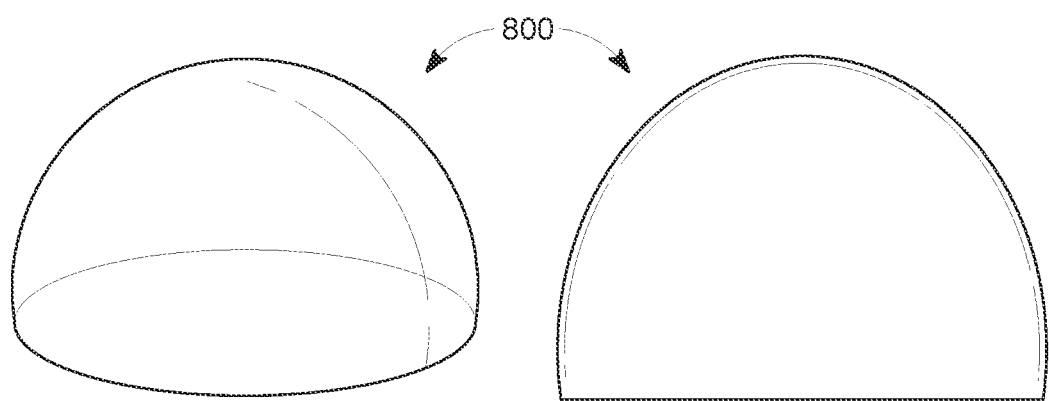
FIG. 8 illustrates an embodiment of the habitable electronic material system.

FIG. 8 illustrates an exterior view of a habitable electronic material system 800 in the shape of a dome. The habitable electronic material system 800 may comprise the same or similar components as other habitable electronic material systems described herein.

Figure 9:
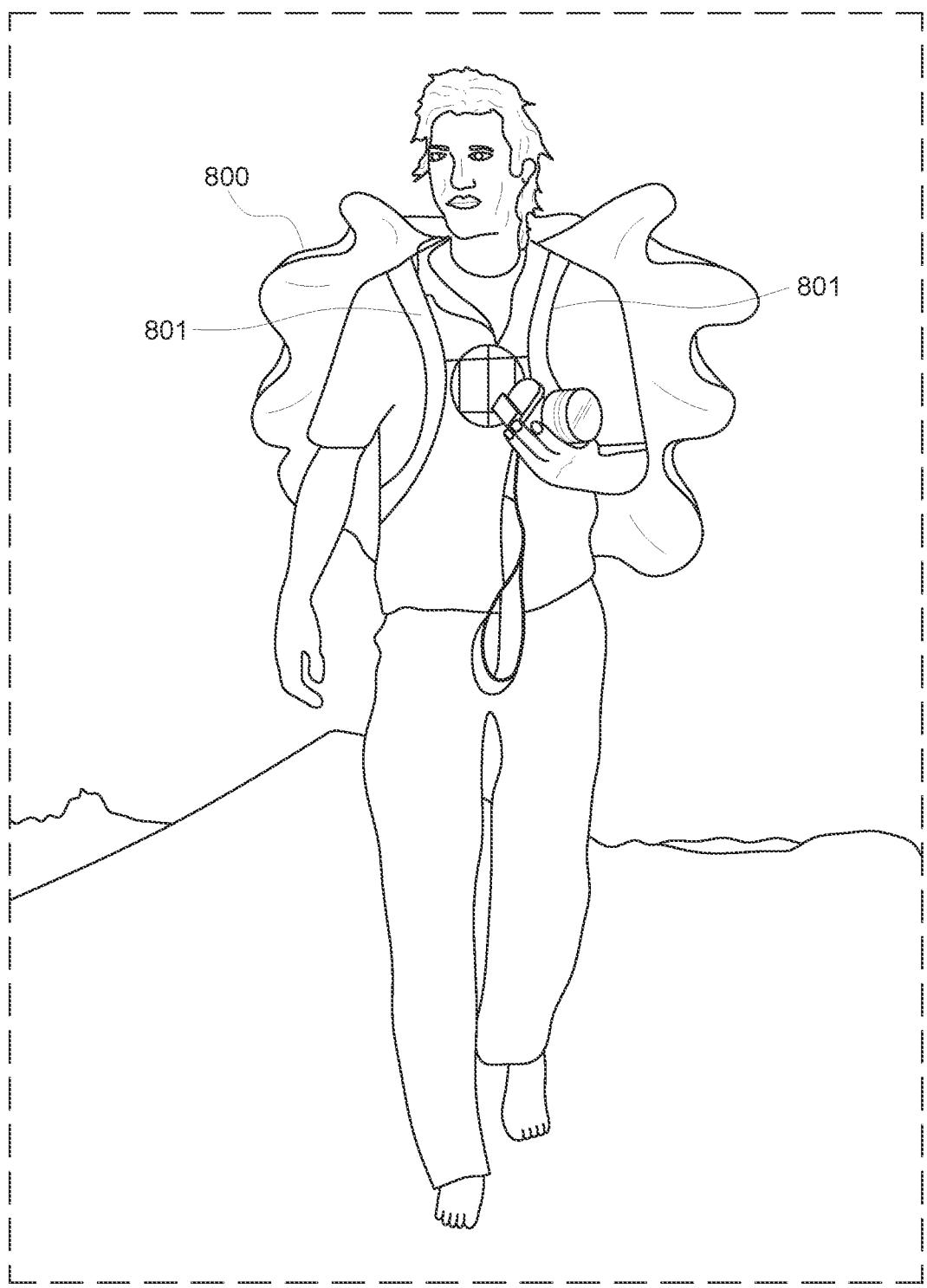
FIG. 9 illustrates a collapsed view of an embodiment of the habitable electronic material system.

FIG. 9 illustrates the habitable material structure 800 in a collapsed state, comprising straps 801 and operable to be positioned on an individual's back.

Figure 10:
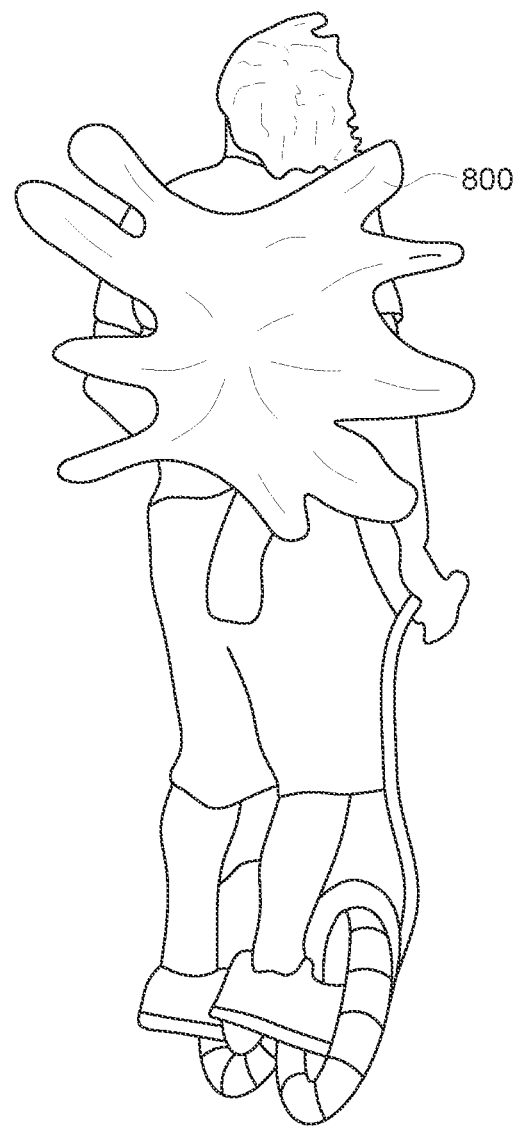
FIG. 10 illustrates a collapsed view of an embodiment of the habitable electronic material system.

FIG. 10 illustrates the habitable material structure 800 in a collapsed state from a rear point of view.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

Embodiment 1: A habitable electronic material system may comprise at least one bonded layer of material. The bonded layer of material may have at least one embedded electronic sensor. The at least one embedded electronic sensor may be operable to detect at least one environmental indicator. The at least one bonded layer of material may comprise a flexible material and may be operable to form an interior of the habitable electronic material system operable to accommodate a user. The at least one bonded layer may comprise a water-resistant layer, a solar energy collection subsystem layer protected by the water resistant layer, a thermal insulator layer under the solar energy collection subsystem layer, an energy storage subsystem layer under the solar energy collection layer, a computer subsystem partially imbedded into the electronic material system and operably coupled with the solar energy collection subsystem and the energy storage subsystem, and a thermal converter subsystem operable to enable a user to control the temperature within the habitable electronic material system.

Embodiment 2: The system of embodiment 1, wherein the at least one bonded layer of material may be operable to form an enclosure.

Embodiment 3: The system of embodiment 2, wherein the enclosure may comprise a structure that is collapsible and transportable by a user.

Embodiment 4: The system of embodiment 1, may further comprise an acoustic subsystem for user-controlled surround sound system output and acoustic distributed microphones input.

Embodiment 5: The system of embodiment 1 may further comprise an optical subsystem for user-controlled lighting and a user-interface screen facing the interior of the habitable electronic material system.

Embodiment 6: The system of embodiment 1, may further comprise a transceiver operably coupled with the computer system and operable to connect with an external integrated communications network.

Embodiment 7: The system of embodiment 3, wherein the solar energy collection subsystem layer may comprise a nano-photovoltaic layer.

Embodiment 8: The system of embodiment 7, may further comprise a thermal nano-polypropylene insulating layer operable to insulate interior system layers and an interior of the habitable electronic material system from external thermal effects.

Embodiment 9: The system of embodiment 8, may further comprise an acoustic nano-polypropylene insulating layer operable to insulate interior system layers and an interior of the habitable electronic material system from external acoustics.

Embodiment 10: The system of embodiment 9, may further comprise a polyvinyl difluoride piezoelectric layer operably coupled with the computer system and operable to receive and transmit acoustic signals.

Embodiment 11: The system of embodiment 10, may further comprise a matrix of nano-scale infrared (IR) emitters operable to emit IR energy at mid-wavelengths, wherein the matrix of nano-scale IR emitter may be operable to sense the IR temperature of the interior of the habitable electronic material system within the enclosure and wherein the matrix of nano-scale infrared (IR) emitters may be operable to emit infrared energy at mid-wavelengths for heating the living space and to sense the IR temperature of at least one user occupying the space Embodiment 12: The system of embodiment 11, may further comprise an array of organic light-emitting diodes (OLED) on an interior surface of the enclosure, the array of OLEDs operable to display visual communications, entertainment, and command/control interaction.

Embodiment 13: The system of embodiment 2, wherein the computer subsystem may further comprise text-to-speech and speech-to-text communication.

Embodiment 14: The system of embodiment 13, wherein the computer subsystem may further comprise a nano-artificial intelligence subsystem or operable access to an artificial intelligence system placed in the cloud.

Embodiment 15: The system of embodiment 14, wherein the computer subsystem may further comprise a machine learning subsystem in communication with the artificial intelligence subsystem.

Embodiment 16: The system of embodiment 1, wherein the energy storage subsystem layer may further comprise a rechargeable battery.

Embodiment 17: The system of embodiment 16, wherein the solar energy collection subsystem interior layer may be operably coupled to each of a rechargeable battery energy storage subsystem layer and to at least one DC power supplies.

Embodiment 18: The system of embodiment 17, wherein the energy storage subsystem layer may further comprise an AC switcher operably coupled to each of DC power supplies, back-up power grid, and a computer subsystem that may be partially embedded into an optical subsystem layer.

Embodiment 19: The system of embodiment 1, wherein the computer subsystem may be partially embedded into the optical subsystem layer.

Embodiment 20: The system of embodiment 19, wherein the optical subsystem layer may further comprise at least one graphics controller in communication with pre-amplifiers and output amplifiers that are in an acoustic subsystem layer, wherein the pre-amplifiers and output amplifiers are operably coupled to DC power supplies and wherein the computer subsystem may be in communication with graphics controllers in the optical subsystem layer.

Embodiment 21: The system of embodiment 19, wherein the acoustic subsystem layer may further comprise distributed microphones operably coupled to pre-amplifiers, wherein the pre-amplifiers are operably coupled with the computer subsystem.

Embodiment 22: The system of embodiment 1, wherein the optical subsystem layer may further comprise graphics controllers operably coupled to temperature controllers in the thermal converter/heating subsystem layer.

Embodiment 23: The system of embodiment 22, wherein the graphics controller may be operably coupled to the optical display surround user-interface screen.

Embodiment 24: The system of embodiment 1, wherein the thermal converter subsystem may further comprise at least one temperature controller in communication with the computer subsystem, and at least one body temperature sensor, in communication with the at least one temperature controller and with the computer subsystem that may be each of partially embedded into the electronic material system.

Embodiment 25: The system of embodiment 24, wherein the thermal converter subsystem may further comprise body temperature sensors partially embedded into the habitable electronic material system and facing the interior of the habitable electronic material system.

Embodiment 26: The system of embodiment 25, wherein the thermal converter subsystem may further comprise a temperature controller operably coupled to distributed infrared (IR) heating elements in the thermal converter subsystem layer.

Embodiment 27: The system of embodiment 1, wherein the wherein the flexible or collapsible habitable enclosure material may be electronically operable by the user for user-controlled multi-function electronic subsystems layered in or partially embedded in the single material.

Embodiment 28: The system of embodiment 1, wherein the flexible or collapsible habitable enclosure material multi-functions as the surround user-interface display screen and computer system operable by the user-inhabitant.

Embodiment 29: The system of embodiment 1, wherein the flexible or collapsible habitable enclosure multi-functions as the surround sound speaker and the surround microphone in communication with a computer subsystem operable by the user-inhabitant.

Embodiment 30: The system of embodiment 1, may further comprise distributed connections throughout the system.

Embodiment 31: The system of embodiment 1, wherein the habitable electronic material system's computer may further comprise at least one pre-programmed surround visual presentation coordinated with at least one pre-programmed acoustic presentation, and with a reactive body-temperature-dependent autonomous program, which may be operable to change the temperature within the enclosure. The pre-programmed optical presentation and the pre-programmed acoustic presentation are operable to induce a change in an inhabitant's brain waves, promoting learning, relaxation, sleep, concentration, productivity, creativity, and artistic expression or treatment of at least one of post-traumatic stress disorder and fatigue.

Embodiment 32: The system of embodiment 5, may further comprise: a physical security subsystem operably in communication with the optical subsystem, acoustic subsystem, and computer subsystem all layered in or partially embedded in one material system, that provides the detection of unauthorized or unwanted entry or penetration of the habitable electronic material as an input to a security alarm or computer record of such an event.

Embodiment 33: The system of embodiment 5, may further comprise at least one medical peripheral operably coupled with the electronic material system.

Embodiment 34: The system of embodiment 33, wherein the at least one medical peripheral may comprise a life support oxygen supply system.

Embodiment 35: The system of embodiment 23, wherein the habitable electronic material system may be operably coupled to a brain-machine interface.

Embodiment 36: The system of embodiment 1 wherein the at least one bonded layer of material may be operable to be coupled with at least one other habitable electronic material system.

Embodiment 37: The system of embodiment 1, wherein the at least one bonded layer of material may be operable to be coupled with an existing apparatus.

Unless otherwise specified, the term "substantially" means within 5% or 10% of the value referred to or within manufacturing tolerances. Unless otherwise specified, the term "about" means within 5% or 10% of the value referred to or within manufacturing tolerances. The conjunction "or" is inclusive.

The terms "first", "second", "third", etc. are used to distinguish respective elements and are not used to denote a particular order of those elements unless otherwise specified or order is explicitly described or required.

Numerous specific details are set forth to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained in software to be used in programming or configuring a computing device.

Embodiments of the methods disclosed may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A habitable electronic material system comprising:
   at least one bonded layer of material having at least one embedded electronic sensor operable to detect at least one environmental indicator, wherein the at least one bonded layer of material is a flexible material and is operable to form an interior of the habitable electronic material system operable to support a user;
   wherein the at least one bonded layer comprises:
   a water-resistant layer;
   a solar energy collection subsystem layer protected by the water resistant layer;
   a thermal insulator layer under the solar energy collection subsystem layer;
   an energy storage subsystem layer under the solar energy collection layer; and
   a computer subsystem at least partially imbedded within the at least one bonded layer of material and operably coupled with the solar energy collection subsystem and the energy storage subsystem;
   a transceiver operably coupled with the computer system and operable to connect with an external integrated communications network; and a thermal converter subsystem operable to enable a user to control the temperature within the habitable electronic material system.

2. The system of claim 1, wherein the at least one bonded layer of material comprises a structure that is collapsible and mobile.

3. The system of claim 2, wherein the at least one bonded layer further comprises an acoustic subsystem operably coupled with the computer system and operable to receive and transmit acoustic signals.

4. The system of claim 2, wherein the solar energy collection subsystem layer comprises:
a nano-photovoltaic layer; and
a thermal nano-polypropylene insulating layer operable to insulate interior system layers and an interior of the habitable electronic material system from external thermal effects.

5. The system of claim 4, wherein the bonded layer further comprises an acoustic nano-polypropylene insulating layer operable to insulate interior system layers and the interior of the habitable electronic material system from external acoustics.

6. The system of claim 5, wherein the bonded layer further comprises:
a matrix of nano-scale infrared (IR) emitters operable to emit IR energy at mid-wavelengths, wherein the matrix of nano-scale IR emitter is operable to sense the IR temperature of the interior of the habitable electronic material system within the enclosure and wherein the matrix of nano-scale infrared (IR) emitters is operable to emit infrared energy at mid-wavelengths for heating the living space and to sense the IR temperature of at least one user occupying the space.

7. The system of claim 2, further comprising:
a physical security subsystem operably in communication with the optical subsystem, acoustic subsystem, and computer subsystem all layered in or partially embedded in one material system, that provides the detection of unauthorized or unwanted entry or penetration of the habitable electronic material as an input to a security alarm or computer record of such an event.

8. The system of claim 2, further comprising at least one medical peripheral operably coupled with the electronic material system.

9. The system of claim 1, wherein the bonded layer further comprises an optical subsystem, wherein the optical subsystem comprises:
at least one light controllable by a user;
and an optical display user-interface screen facing the interior of the habitable electronic material system that may cover at least a portion of an interior surface of the interior of the habitable electronic material system.

10. The system of claim 1, wherein the energy storage subsystem layer further comprises a rechargeable polymer-based paper battery.

11. The system of claim 10, wherein:
the solar energy collection subsystem interior layer is operably coupled to each of the rechargeable polymer-based paper battery energy storage subsystem layer and to at least one DC power supply; and
the energy storage subsystem layer further comprises an AC switcher operably coupled to each of the at least one DC power supply, back-up power grid, and a computer subsystem that is partially embedded into an optical subsystem layer.

12. The system of claim 11, wherein the optical subsystem layer further comprises at least one graphics controller in communication with at least one pre-amplifier and at least one output amplifier that are comprised within an acoustic subsystem layer, wherein the at least one pre-amplifier and the at least one output amplifier are operably coupled to DC power supply and wherein the computer subsystem is in communication with a graphics controller comprised within the optical subsystem layer.

13. The system of claim 1, wherein the optical subsystem layer further comprises at least one graphics controller operably coupled to a temperature controller comprised within the thermal converter subsystem layer, wherein the at least one graphics controller is operably coupled to the optical display user-interface screen.

14. The system of claim 1, wherein the thermal converter subsystem further comprises:
at least one temperature controller in communication with the computer subsystem; and
at least one body temperature sensor, in communication with the at least one temperature controller and with the computer subsystem that is each of partially embedded into the electronic material system; and
at least one body temperature sensor partially embedded into the habitable electronic material system and facing the habitable interior space.

15. The system of claim 14, wherein the computer subsystem further comprises:
a nano-artificial intelligence subsystem operable access to an artificial intelligence system placed in the cloud; and
a machine learning subsystem in communication with the artificial intelligence subsystem.

16. The system of claim 14, wherein the thermal converter subsystem further comprises:
a temperature controller operably coupled to distributed infrared (IR) heating elements in the thermal converter subsystem layer; and
a heat pump operably coupled with the temperature controller, wherein the heat pump is operable to provide heating and cooling.

17. The system of claim 1, wherein the at least one bonded layer of material is operable to be coupled with an existing apparatus or at least one other habitable electronic material system.

18. The system of claim 1, wherein the habitable electronic material system is operable to be operably coupled with at least one brain-computer interface and may be operable to receive commands to control the habitable electronic material system based on a user's brain activity.

19. A habitable electronic material system comprising:
at least one bonded layer of material having at least one embedded electronic sensor operable to detect at least one environmental indicator, wherein the at least one bonded layer of material is a flexible material and is operable to form an interior of the habitable electronic material system operable to support a user and operable to be collapse and transported by a user;
wherein the at least one bonded layer comprises:
a water-resistant layer;
a solar energy collection subsystem layer protected by the water resistant layer, the solar energy collection subsystem layer comprising:
a nano-photovoltaic layer; and
a thermal nano-polypropylene insulating layer operable to insulate interior system layers and an interior of the habitable electronic material system from external thermal effects;
a thermal insulator layer under the solar energy collection subsystem layer;

an energy storage subsystem layer under the solar energy collection layer; and a computer subsystem at least partially imbedded within the at least bonded layer of material and operably coupled with the solar energy collection subsystem and the energy storage subsystem;

a transceiver operably coupled with the computer system and operable to connect with an external integrated communications network;

a thermal converter subsystem operable to enable a user to control the temperature within the habitable electronic material system;

an acoustic subsystem, the acoustic subsystem comprising a polyvinyl difluoride piezoelectric layer operably coupled with the computer system and operable to receive and transmit acoustic signals; and an optical subsystem, wherein the optical subsystem comprises:
  at least one light controllable by a user; and
  an optical display user-interface screen facing the interior of the habitable electronic material system.

20. The system of claim 19, wherein:

the acoustic layer further comprises an acoustic nano-polypropylene insulating layer operable to insulate interior system layers and the interior of the habitable electronic material system from external acoustics;

the optical subsystem layer further comprises at least one graphics controller operably coupled to a temperature controller comprised within the thermal converter/heating subsystem layer, wherein the at least one graphics controller is operably coupled to the optical display user-interface screen;

the solar energy collection subsystem interior layer is operably coupled to each of the rechargeable polymer-based paper battery energy storage subsystem layer and to at least one DC power supply; and the energy storage subsystem layer further comprises an AC switcher operably coupled to each of the at least one DC power supply, back-up power grid, and a computer subsystem that is partially embedded into an optical subsystem layer; and the computer subsystem further comprises:
  a nano-artificial intelligence subsystem operable access to an artificial intelligence system placed in the cloud; and
  a machine learning subsystem in communication with the artificial intelligence subsystem.

* * * * *